United States Patent [19]
Ishida et al.

[11] Patent Number: 4,843,417
[45] Date of Patent: Jun. 27, 1989

[54] LIGHT MEASURING DEVICE

[75] Inventors: Tokuji Ishida, Daito; Hiroshi Ootsuka, Sakai; Hiromu Mukai, Kawachinagano, all of Japan

[73] Assignee: Minolta Camera Kabushiki Kaisha, Osaka, Japan

[21] Appl. No.: 248,380

[22] Filed: Sep. 22, 1988

Related U.S. Application Data

[62] Division of Ser. No. 14,708, Feb. 13, 1987, Pat. No. 4,791,446.

[30] Foreign Application Priority Data

| Feb. 14, 1986 | [JP] | Japan | 61-29960 |
| Feb. 14, 1986 | [JP] | Japan | 61-29961 |
| May 2, 1986 | [JP] | Japan | 61-102550 |
| May 2, 1986 | [JP] | Japan | 61-102551 |
| May 2, 1986 | [JP] | Japan | 61-102552 |
| May 2, 1986 | [JP] | Japan | 61-102553 |

[51] Int. Cl.$^4$ ............... G03B 3/12; G03B 7/093; G03B 7/28
[52] U.S. Cl. ............... 354/408; 354/412; 354/432; 354/456
[58] Field of Search ............... 354/408, 432, 412, 456

[56] References Cited

U.S. PATENT DOCUMENTS

| 3,855,601 | 12/1974 | Uchiyama et al. | 354/31 |
| 4,047,187 | 9/1977 | Mashimo et al. | 354/23 |
| 4,387,975 | 6/1983 | Araki | 354/25 |
| 4,391,500 | 7/1983 | Tsunekawa | 354/31 |
| 4,488,799 | 12/1984 | Suzuki et al. | 354/406 |
| 4,547,676 | 10/1985 | Suzuki et al. | 250/578 |
| 4,563,708 | 1/1986 | Ishibashi | 358/213 |
| 4,609,274 | 9/1986 | Iwashita et al. | 354/400 |
| 4,636,624 | 1/1987 | Ishida et al. | 250/201 |
| 4,643,557 | 2/1987 | Ishizaki et al. | 354/406 |
| 4,660,955 | 4/1987 | Ishida et al. | 354/408 |
| 4,693,582 | 9/1987 | Kawamura et al. | 354/403 |
| 4,746,947 | 5/1988 | Nakai | 354/402 |

FOREIGN PATENT DOCUMENTS 60-129732 7/1985 Japan.
60-153274 8/1985 Japan.
60-140929 9/1985 Japan.

Primary Examiner—Michael L. Gellner
Attorney, Agent, or Firm—Burns, Doane, Swecker & Mathis

[57] ABSTRACT

A light measuring device, for use in a camera having an objective lens, for measuring a brightness of a spot of an object, uses an autofocus detecting system which includes an array of light receiving elements for producing charges at a rate relative to an intensity of the light impinging thereon from the object, and a light receiver provided adjacent the light receiving element array for producing a photocurrent at an amount relative to an intensity of the light impinging thereon from said object. The charges produced from the light receiving elements are integrated in a plurality of charge accumulation portions, respectively, and the charges produced by the light receiver is integrated in a capacitor. A comparator is provided for for comparing the integrated charges with a predetermined level, and for producing a stop integration signal when the integrated charges reaches the predetermined level so as to stop the integration in the first integration means. A spot brightness detector is provided for detecting the brightness of the spot of the object using the integrated charges from the capacitor.

2 Claims, 17 Drawing Sheets

LIGHT MEASURING DEVICE

This application is a division of application Ser. No. 014,708, filed Feb. 13, 1987.

CROSS REFERENCE TO THE RELATED APPLICATION

This application is related to the following patents and applications.

(A) U.S. Pat. Nos. 4,547,676, 4,047,187, 4,387,975, 4,563,708, 4,636,624, 3,855,601, 4,609,274: and (B) U.S. patent application Ser. No. 832,702 filed Feb. 25, 1986 assigned to the same assignee as the present application.

(C) Japanese Patent Laid-Open Publication Nos. 60-153274, 60-129732 Japanese UM Laid-Open Publication No. 60-140929.

BACKGROUND OF THE INVENTION

1. Field of the Invention

The present invention relates to a light measuring device employing a focus detecting device and, more particularly, to a light measuring device which is capable of measuring the brightness of an object in spots.

2. Description of the Prior Art

It is know in the prior art, such as disclosed in Japanese Patent Laid-open Publication No. 60-129732, to carry out a spot measuring using a light receiver employed in the distance measuring device. According to this prior art reference, the signal produced from the light receiver is used, alternately in a time sharing manner, for obtaining information for distance measuring and for obtaining information for light measuring. Therefore, it takes time to complete light measuring, as well as distance measuring. This will result in such a disadvantage that there may be a difference between the spot from which the distance information is obtained and the spot from which the brightness information is obtained.

To avoid this disadvantage, it is possible to provide one light receiver for obtaining the distance information and another light receiver for obtaining the brightness information. However, this results in a high manufacturing cost.

It is also known in the prior art, such as disclosed in U.S. Pat. No. 4,387,975, to use output signals from a photoelectric element array such as a CCD (charge coupled device) for obtaining the brightness of the object. However, since the obtained signals are the voltage signals representing the amount of accumulated charges in the CCD cells, it is very difficult to precisely detect the brightness level. For example, if the brightness signal Bv is required to be varied between 0 and 13, it is necessary to detect the voltage signal in $2^{13}(=8192)$ different levels. To meet this requirement, it is necessary to provide a photoelectric element array which can produce an output in a wide range, or to provide a voltage detecting circuit having a high resolving power. For example, in the former situation, if the voltage signal shows 10 millivolts for Bv=0 the same photoelectric element array must produce a voltage signal of 80 volts for Bv=13. Also, in the later situation, if the voltage signal shows 6 volts for Bv=13, the same photoelectric element array will produce a voltage signal of 750 microvolts for Bv=13, resulting in the necessity of a voltage detector with a high resolving power. Also, due to the dark current produced from the CCD, S/N ratio will become poor particularly for detecting low voltages.

Also in the prior art, such as disclosed in Japanese Patent Laid-open Publication No. 60-202414, a focus detection device is disclosed, which includes a light receiver composed of CCD for measuring distance and a light receiver for monitoring the amount of light received by the distance measuring light receiver for controlling the integrating time of CCD. Since the monitor light receiver detects the brightness of the object with a narrow viewing angle, the monitor light receiver is used also for the spot light measuring. However, this arrangement has disadvantages that the proper light measuring can not be done if the monitor light receiver is aiming at a point outside the object to be focused, and that since the viewing angle of the monitor light receiver is very narrow, the narrow spot aimed by the monitor light receiver may incidentally coincide with a spot on the object from which a strong light is produced. Another problem is that, when the light measuring device of the above described type is employed in a camera, there may be a case when the spot measuring can not be carried out because of the special type of the objective lens mounted on the camera body.

Also, in the above-mentioned reference, Japanese Patent Laid-open Publication No. 60-129732, a camera is disclosed which includes a first light receiver for effecting the spot light measuring, a second light receiver for effecting the average light measuring, and a comparator for comparing the signals obtained from the spot light measuring and the average light measuring for detecting a back lighting condition. According to this prior art, since the light receiver provided for use in the active type focus detecting device is used as the first light receiver, there will be no two different cases, i.e., a case when the spot measuring is possible, and a case when the spot measuring is not possible. Thus, there is no need of automatic switching between the spot measuring and the average measuring.

Also, in the above-mentioned reference, U.S. Pat. No. 4,387,975, it is disclosed that the distance calculation and exposure data calculation are carried out in a time sharing manner using the data obtained from the light receiver in the focusing detecting device. It is also disclosed that the light receiver can be provided separately from the focus detecting device. However, if it is not possible to carry out the light measuring using the light receiver in the focus detecting device, only a warning operation is performed in this reference.

It is further known in the prior art, such as disclosed in U.S. Pat. No. 4,047,187, to use output signals from a photoelectric element array of a CCD type or a MOS type for obtaining, alternately in a time sharing manner, distance information and brightness information. According to this prior art reference, the signals produced from the light receiver are sequentially logarithmically compressed and converted to a digital form and are used for the focus detection calculation. After this calculation, the signals produced from the light receiver are again sequentially logarithmically compressed and converted to a digital form and are added and divided by the number of signals added to obtain an average brightness information. In this manner, the process for obtaining the distance information and the process for obtaining the brightness information are effected at different times, resulting in a long data preparation time.

It is also known in the prior art, such as disclosed in U.S. Pat. No. 4,547,676, to stop the integration in the light receiver when the output voltage obtained from the light receiver has reached a predetermined reference voltage. This is carried out by the use of a comparator.

Also, in some prior art light measuring device, a filter circuit such as a CR integration circuit is employed to reduce the ripple signals caused by the fluorescent lamp light. However, no light measuring device of charge accumulation type has been proposed which can provide a correct light amount signal even under the fluorescent lamp light.

SUMMARY OF THE INVENTION

The present invention has been developed with a view to substantially solving the above described disadvantages and has for its essential object to provide an improved light measuring device using a focus detecting device.

It is also an essential object of the present invention to provide an improved light measuring device which can carry out the spot light measuring by the use of light receiver provided for focus detecting device.

It is a further object of the present invention to provide an improved light measuring device which can carrying out the brightness detection by detecting the integration time of the focus detecting device.

It is another object of the present invention to provide an improved light measuring device wherein the spot light measuring is carried out by a light receiver provided for focus detecting device and the average light measuring is carried out by another light receiver.

It is yet another object of the present invention to provide an improved light measuring device wherein a reliability detecting means is provided for detecting the reliability of data of spot light measuring.

In accomplishing these and other objects, a light measuring device according to the present invention comprises: first light receiving means having a plurality of light receiving elements for producing charges at a rate relative to an intensity of the light impinging thereon from the object; first integration means having a plurality of charge accumulation portions for integrating charges produced from corresponding light receiving elements; second light receiving means provided adjacent the first light receiving means for producing a photocurrent at an amount relative to an intensity of the light impinging thereon from said object; second integration means for integrating the photocurrent; comparing means for comparing the integrated photocurrent with a predetermined level, and for producing a stop integration signal when the integrated photocurrent reaches the predetermined level so as to stop the integration in the first integration means; focus detection means for detecting the focus condition of the photographing lens with respect to the object using the integrated charge data from the first integration means; and spot brightness detecting means for detecting the spot brightness of the spot of the object using the integrated photocurrent from the second integration means.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 3:
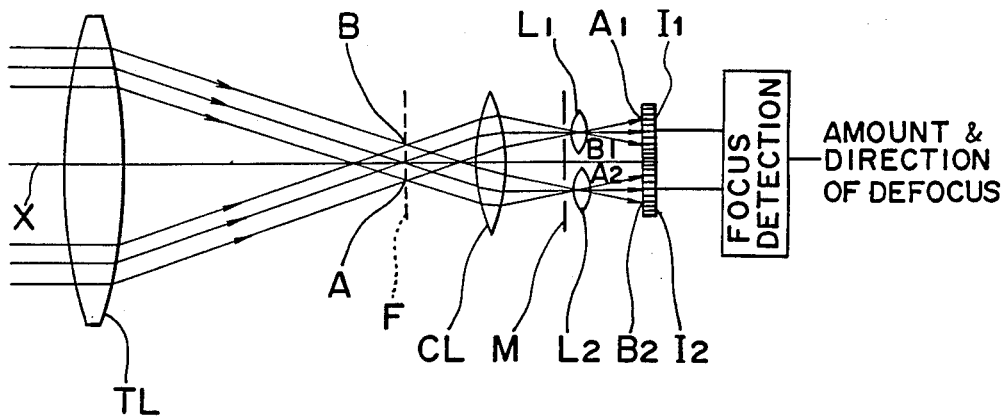
FIG. 3 is a diagrammatic view showing an optical arrangement of the light measuring device using an infocus detecting device according to the present invention.

Referring to FIG. 3, an optical arrangement of a focus detecting device is shown, which is to be used in a light measuring device of the present invention. In FIG. 3, TL is an objective lens, CL is a condenser lens, L1 and L2 are a pair of reimaging lenses symmetrically disposed with respect to the main optical axis X of the objective lens TL, M is a mask for restricting the light to be incident on lenses L1 and L2, F is an image forming plane of the objective lens TL and is equivalent to a plane on which the film extends, and I1 and I2 are image sensors of charge accumulation type. According to the optical system shown, images A and B formed on plane F within restricted areas are reformed as images A1 and B1 on image sensor I1, and as images A2 and B2 on image sensor I2. A distance between the two images on image sensors I1 and I2 changes relatively to the focus condition of objective lens TL, i.e., relatively to the degree of defocus of the image formed on image forming plane F. Accordingly, by the detection of the intensity distribution on the image sensors I1 and I2 in accordance with the output signals from image sensors I1 and I2, a focus detection circuit defined by a microcomputer produces signals representing the amount and direction of the defocus.

Figure 2:
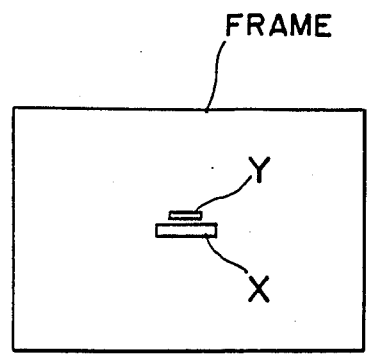
FIG. 2 is a diagrammatic view showing an area in which the light measuring can be carried out.

Referring to FIG. 2, a block X shown within a photographing frame represents a range from which image sensor I1 or I2 of the distance measuring device receives light to effect the distance measuring. The range X is indicated and can be viewed through a viewfinder (not shown). A block Y, adjacent block X, represents a range from which a monitor light receiver receives light. The range Y is not indicated and, therefore, can not be viewed through the viewfinder. The monitor light receiver is provided for controlling the integration time in image sensors I1 and I2 so that the amount of charge accumulated in image sensors I1 and I2 will be within an appropriate level. For example, when the target object to be measured is relatively dark, the integration time will be long, and when the target object to be measured is relatively bright, the integration time will be short.

Figure 1:
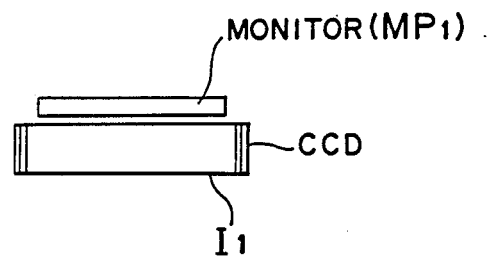
FIG. 1 is a plan view of a light receiver used in a light measuring device using an infocus detecting device according to a first embodiment of the present invention.

Referring to FIG. 1, a plan view of one image sensor I1 and a monitor light receiver MP1 provided adjacent thereto are shown, according to a first embodiment. As understood from FIG. 3, image sensors I1 and I2 receive light from the same area in the target object to be measured and, therefore, the amounts of light impinging on the image sensors I1 and I2 are the same. Therefore, it is not necessary to provide one monitor light receiver for each image sensor to control the integration time in image sensors I1 and I2, but only one monitor light receiver is sufficient to control the integration time in image sensors I1 and I2. Therefore, in the embodiments herein disclosed, the monitor light receiver is provided in association with one image sensor, e.g., I1.

Figure 4:
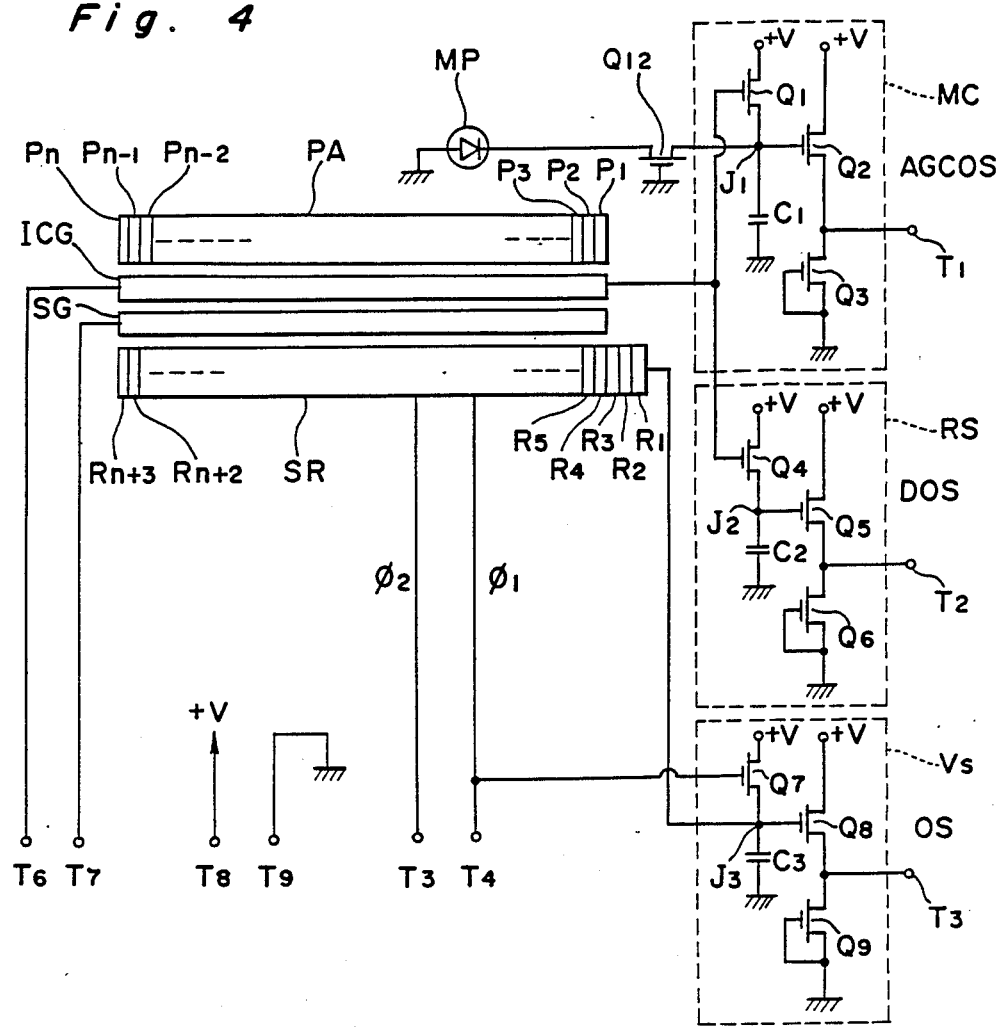
Fig 4 is a circuit diagram of a portion where an photoelectric conversion is effected in the present invention.

Referring to FIG. 4, a photoelectric converter including image sensors I1 and I2 is shown. The photoelectric converter comprises: a photosensor array PA defined by photosensors P1, P2, P3 . . . $P_{n-2}$, $P_{n-1}$ and $P_n$ aligned in a row; an integration clear gate ICG for initializing photosensor array PA; a shift gate SG; and CCD shift register SR defined by cells R1, R2, R3 . . . $R_{n+1}$, $R_{n+2}$ and $R_{n+3}$ for receiving and temporarily storing the charges accumulated in photosensor array PA through shift gate SG. The number of cells in CCD shift register SR, serving as a transfer portion for sequentially transferring the accumulated charges to a video signal producer Vs in synchronism with transfer pulses $\phi 1$ and $\phi 2$, is greater by 3 than the number of photosensors (=the number of picture elements) of image sensor array PA, serving as an electric charge accumulation portion. Cells R1, R2 and R3 are used for the idle transfer, which will be described later. The electric charge accumulated in each of photosensors P1, P2, P3 . . . $P_{n-2}$, $P_{n-1}$ and $P_n$ of image sensor array PA is transferred to cells R4, R5, R6 . . . $R_{n+1}$, $R_{n+2}$ and $R_{n+3}$.

Figure 5:
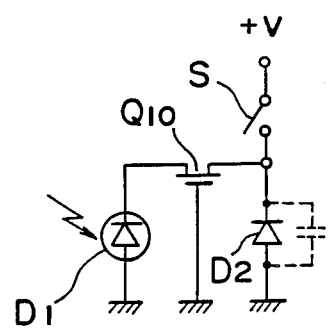
FIG. 5 is a circuit diagram showing a principle operation in each cell for the charge accumulation.

As shown in FIG. 5, each photosensor is defined by a photodiode D1 and a PN junction type diode D2 capable of accumulating charges. The cathodes of the diodes D1 and D2 are connected to a gate-grounded FET Q10. Switch S, representing an integration clear gate ICG, is provided for the supply of power from source of power +V. Photodiode D1 is so arranged as to receive light. FET Q10 has its gate connected to ground and is provided to maintain the voltage across diode D1 almost constant to neglect the capacitor component of photodiode D1. When switch S closes (i.e., when an integration clear signal ICGS is applied), the electric charge will be accumulated between the anode and cathode of diode D2 so that the cathode voltage of D2 becomes equal to the power supply voltage +V. In this manner a photosensor is initialized. Then when switch S opens (i.e., when integration clear signal ICGS disappears), diode D2 is discharged through the FET Q10 by the photoelectric current produced by diode D1 so that the cathode voltage of D2 drops as the time passes. It may be so considered that the negative charge is accumulated in the cathode of diode D2 at a speed corresponding to the intensity of the light impinging on diode D1. Accordingly, the accumulation of the electric charge is carried out at a speed corresponding to the intensity of light impinging on each of the photosensors.

Switch S is defined by a semiconductor analog switch, which turns in when an integration clear signal ICGS is applied to integration clear gate ICG and turns off when the signal ICGS disappears. Upon receipt of a shift pulse, shift gate SG transmits the accumulated electric charge in photosensors P1, P2, P3 . . . Pn−2, Pn−1, and Pn parallel to cells R4, R5, R6 . . . Rn+1, Rn+2 and Rn+3 of CCD shift register SR. The generation of the shift pulse will be described later. The charge accumulation in photosensors P1, P2, P3 . . . Pn−2, Pn−1 and Pn will be completed when the shift pulse is applied to shift gate SG. Thus, the charge accumulation starts when the integration clear signal ICGS disappears, and ends when the shift pulse is applied to shift gate SG. Also, while the transfer pulses $\phi 1$, $\phi 2$ are inputted, CCD shift register SR sequentially outputs the accumulated charge in one cell to the video signal producer Vs.

Terminals T8 and T9 shown in FIG. 4 are provided for the power supply of +V to photosensor array PA, a brightness monitoring circuit MC, a reference signal generating circuit RS and the video signal producer Vs.

Referring back to FIG. 5, MP designates a photodiode which is provided adjacent photosensor array PA for monitoring the amount of light received by the photosensor array PA. Brightness monitoring circuit MC, reference signal generating circuit RS and video signal producer Vs are also included in the photoelectric converter. The brightness monitoring circuit MC is defined by FETs Q1, Q2 and Q3 and capacitor C1. FET Q1 has its gate connected to integration clear gate ICG, and is made conductive upon receipt of an integration clear signal ICGS obtained through integration clear gate ICG. Accordingly, voltage of a junction J1 of the gate of FET Q2 and the capacitor C1 is lifted up to the voltage +V in response to the conduction of FET Q1. The junction J1 between FET Q1 and capacitor C1 is connected to the anode of photodiode MP through FET Q12 and also to the gate of FET Q2. The FET Q12 has its base grounded and is provided to maintain the voltage across photodiode MP almost constant. Monitor photodiode MP operates in a similar manner to the photosensors. More specifically, when the integration clear signal ICGS disappears, photodiode MP starts to accumulate charges in the negative direction at a speed relative to the intensity of the light impinging on the photodiode MP. FETs Q2 and Q3 are connected in series, between the power supply and ground, and constitutes a buffer. Since FET Q3 is used as a source follower, a voltage signal AGCOS corresponding to the electric potential at junction J1 is produced from output terminal T1 extending from the junction between FETs Q2 and Q3.

Figure 6:
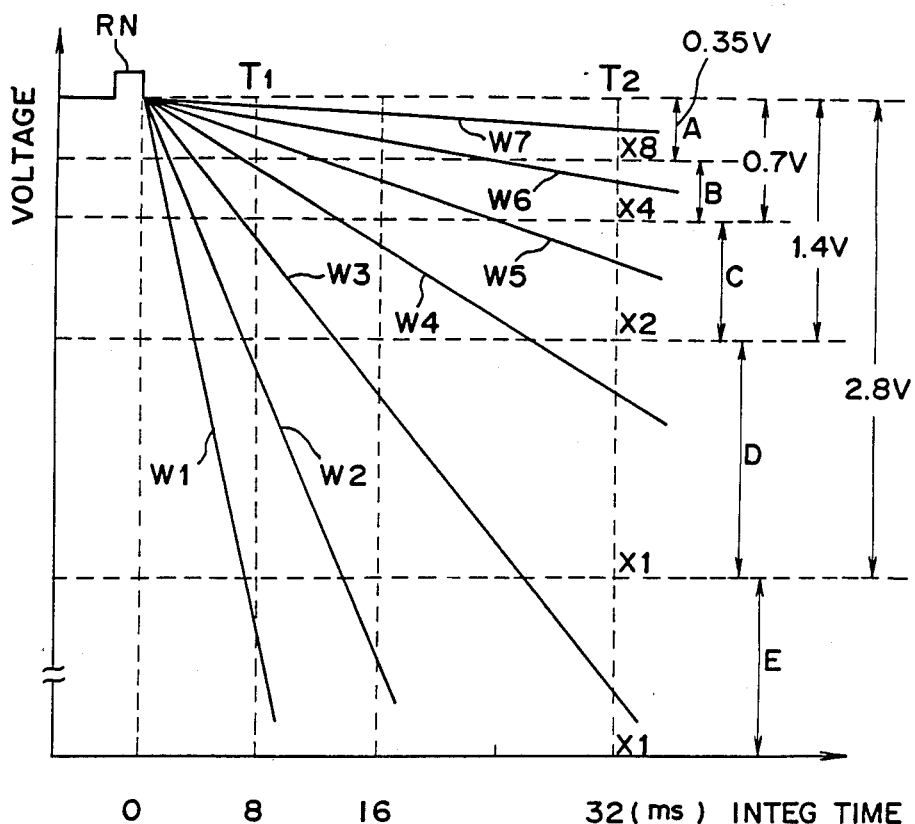
FIG. 6 is a graph showing output signals from a monitoring circuit employed in the circuit of FIG. 4.

The graph in FIG. 6 shows the change of the output voltage signal AGCOS at terminal T1 with respect to time in which lines W1, W2, W3, W4, W5, W6 and W7 represent different objects having different brightness. In FIG. 6, a step-up portion indicated by RN represents an induction noise caused by the integration clear pulse.

Referring back to FIG. 4, the reference voltage generating circuit RS is defined by FETs Q4, Q5 and Q6 and capacitor C2, which have the same characteristics as those of the above-described FETs Q1, Q2 and Q3 and capacitor C1, respectively. Furthermore, the circuit connection is very similar to that in brightness monitor circuit MC. The only difference is that junction J2 between FET Q4 and capacitor C2 is connected only to the gate of FET Q5. Also, since the circuits MC and RS are formed on the same IC chip, both circuits have the same characteristics. Accordingly, a voltage signal DOS produced from output terminal T2 connected to a junction between FETs Q5 and Q6 is maintained constant even after the disappearance of the integration clear signal ICGS. Accordingly, when the integration clear signal ICGS disappears, the voltage level at junction J2 is exactly the same as junction J1, provided that no signal is supplied from monitor photodiode MP. Thus, the voltage signal produced from terminal T2 can be used as a reference voltage for obtaining the degree of voltage drop of the voltage signal produced from terminal T1.

The video signal producer Vs is defined by FETs Q7, Q8 and Q9 and capacitor C3 Preferably, these elements should be selected as having the same characteristics as those of FETs Q1, Q2 and Q3 and capacitor C1. In the circuit connection, the one difference is that transfer clock pulse $\phi 1$ is applied to the gate of FET Q7. Also, junction J3 between FET Q7 and capacitor C3 is connected to the gate of the FET Q8 and also to the transfer terminal of CCD shift register SR of the image sensor. Thus, each time one transfer pulse $\phi 1$ is applied, FET Q7 conducts at the positive edge of each transfer pulse $\phi 1$, thereby charging capacitor C3 to a level equal to the power supply voltage +V shifted by the given voltage drop by FET Q7. Then, the video signal producer Vs is reset. The discharging operation starts by the negative edge of the same pulse $\phi 1$, and the discharge amount is dependent on the accumulated charge transferred from CCD shift register SR. The above described charge and discharge are repeated in synchronism with the transfer pulse $\phi 1$. Accordingly, a signal corresponding to the accumulated electric charge in each photosensor, representing a picture element of the image sensor is sequentially outputted as the voltage signal OS from output terminal T3 connected to a junction between FETs Q8 and Q9. A series of these signals form an image signal or video signal.

Figure 7:
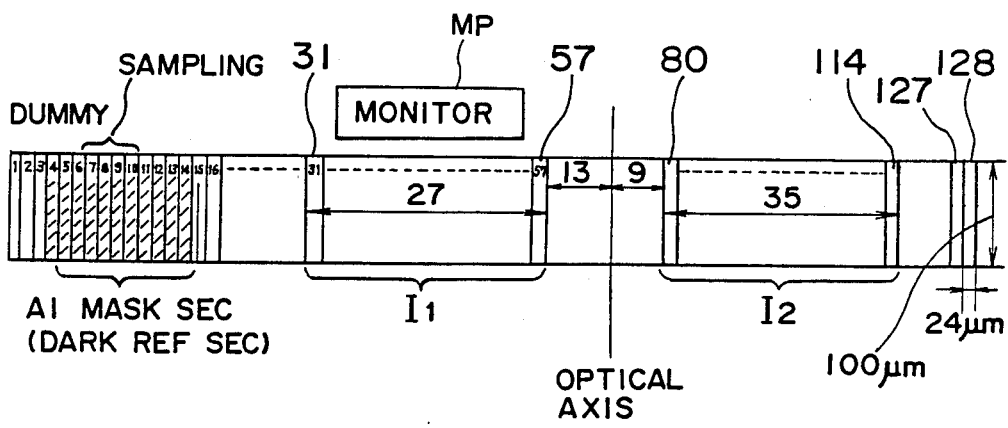
FIG. 7 is a diagrammatic view of a CCD shift register employed in the circuit of FIG. 4.

Referring to FIG. 7, a map of CCD shift register SR is shown, indicating sections for storing various data. CCD shift register SR includes cells numbered by No.-1–No.128 in which 27 cells of No.31–No.57 are used for image sensor I1 shown in FIG. 3, and 35 cells of No.8-0–No.114 are used for image sensor I2. The reason why the number of cells in the second image sensor I2 is greater than that in the first image sensor I1 is that, in operation, signals from 27 cells in the first image sensor I1 are first compared with signals from 27 cells of No.8-0–No.106 in the second image sensor and, thereafter, the same signals from the first image sensor I1 are compared with signals from 27 cells of No.81–No.107. In this manner, the selection of the signals in the second image sensor I2 is shifted by one cell each time the comparison is effected until the last 27 cells of No.8-7–No.114 are selected. By correlating the signals from the first and second image sensors, focusing condition of the objective lens, namely, in-focus condition, front-focus condition, or rear-focus condition, can be detected.

The first three cells No.1–No.3 are dummy cells and are used for the idle transfer. Next cells of No.4-half of No.15 are covered with a light shield mask, such as an aluminum film deposited by the vapor deposition, for producing a dark current. The section with the aluminum mask is also referred to as a dark reference section, in which the electric characteristic is slightly changed by the aluminum deposition.

Figure 8:
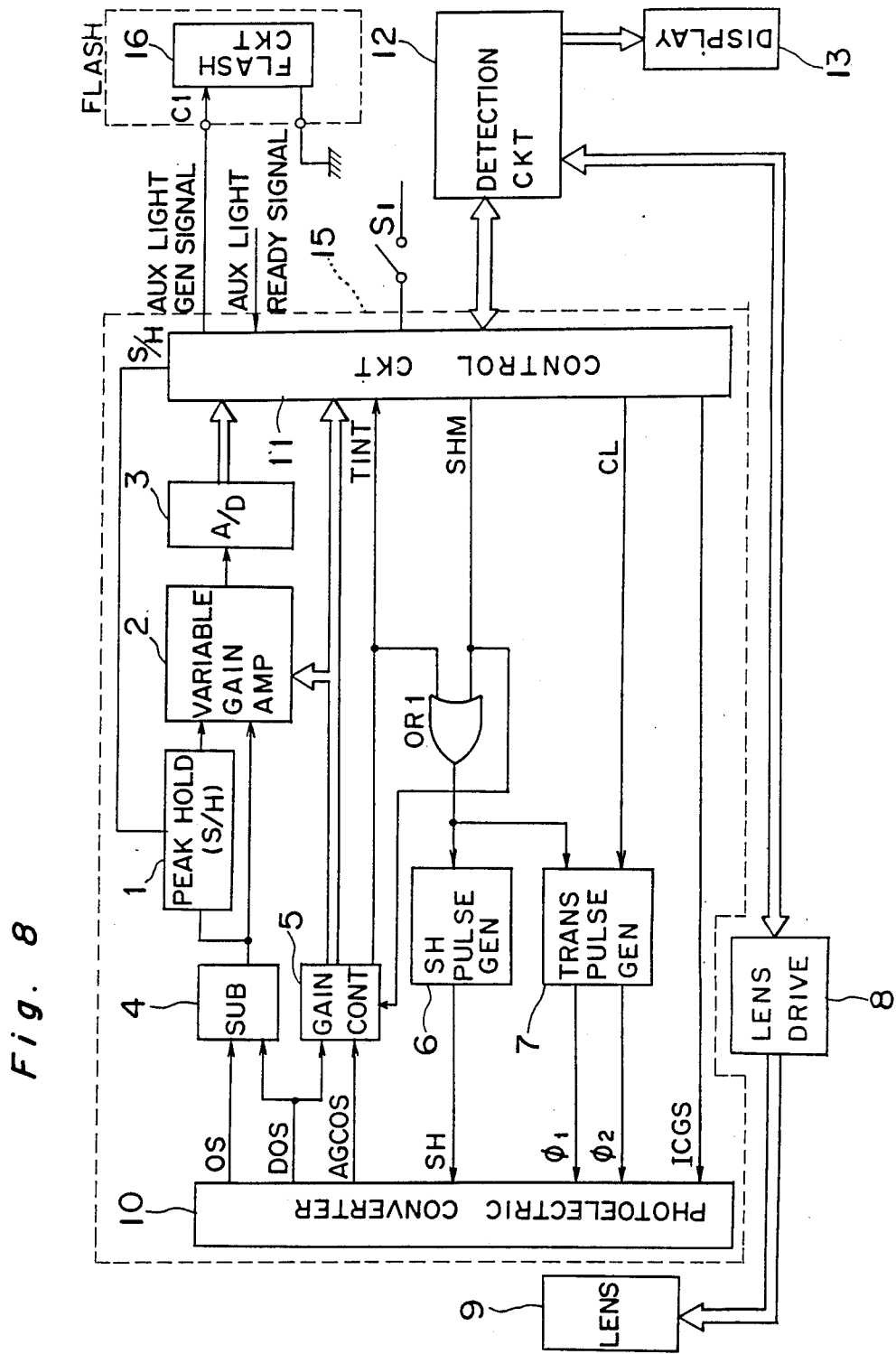
FIG. 8 is a block diagram showing various circuits employed in the embodiment of the present invention.

Referring to FIG. 8, a circuit arrangement according to one embodiment of the present invention is shown in which control circuit 11 and detection circuit 12 are formed by a microcomputer. Upon half way depression of a shutter release button (not shown), switch S1 turns on to start the focus detection control in control circuit 11. Thus, control circuit 11 provides the integration clear signal ICGS to photoelectric converter 10 so that all of the photosensor are reset to the initial condition and, at the same time, the output signal AGCOS from brightness monitor circuit MC is recovered to the initial condition holding the voltage level approximately equal to the source voltage level. Then, when the integration clear signal ICGS disappears, all of the photosensor in the photoelectric converter 10 start the light integration and, at the same time, brightness monitor circuit MC starts to measure the brightness of the object. The output voltage signal AGCOS from brightness monitor circuit MC gradually decreases at a speed relative to the brightness of the object.

A gain control circuit 5 receives reference voltage signal DOS from reference voltage generator RS for preparing four different level reference voltages and compares brightness signal AGCOS from brightness monitor circuit MC with four different level reference voltages to determine the gain of variable gain amplifier 2. In the case when the brightness signal AGCOS from brightness monitor circuit MC decreases very fast, gain control circuit 5 produces a HIGH level signal TINT in response to the drop of the brightness signal below a predetermined level within a certain time TM1, such as 32 milliseconds, after the disappearance of integration clear signal ICGS. The HIGH level signal TINT is applied to control circuit 11 and also through OR gate OR1 to a shift pulse generator 6, which thereupon provides a shift pulse SH to photoelectric converter 10. Then, by shift pulse SH, the photosensors in converter 10 stop the light integration and in turn, the accumulated charges are shifted parallel to the cells in the CCD shift register SR.

In the meantime, in response to the turn on of switch S1, control circuit 11 provides clock pulses CL to a transfer pulse generator 7, which thereupon produces transfer pulses $\phi1$ and $\phi2$ having a 180° phase difference to each other. More specifically, a transfer pulse $\phi1$ from transfer pulse generator 7 steps up in response to the change of OR gate output from LOW to HIGH level. In this manner, transfer pulse $\phi1$ takes a synchronization with shift pulse SH. In the case when shift pulse SH and transfer pulse $\phi1$ are not synchronized that there is a time gap between shift pulse SH and transfer pulse $\phi1$, CCD shift register SR, having some degree of light sensitivity, accumulates charges during the time gap at amount relative to the intensity of light impinging thereon. The accumulated charges in the shift register SR results in an error signal added to the image signal. To prevent the generation of such an error signal, the time gap is eliminated to make transfer pulse $\phi1$ in synchronism with shift pulse SH.

Thereafter, from transfer pulse generator 7, transfer pulses $\phi1$ and $\phi2$ are applied to photoelectric converter 10 which produces, in synchronism with the negative edge of the transfer pulse $\phi1$, voltage signals OS representing the accumulated charges in CCD shift register SR sequentially from one end (from cell of No.1 shown in FIG. 7) of the array. The voltage signal OS has its level reduced relatively to the amount of light impinging on the photosensor. The generated voltage signal, serving as an image signal, is applied to subtracter 4 which produces a subtracted voltage signal (DOS-OS), serving as a picture element signal.

In the case when the voltage of brightness signal AGCOS from brightness monitor circuit MC does not fall below the predetermined level within the certain time TM1, (32 milliseconds) after the disappearance of integration clear signal ICGS, gain control circuit 5 will not produce the HIGH level signal TINT. In this case, after the elapse of the certain time TM1 (32 milliseconds), control circuit 11 produces a shift pulse generation command signal SHM which is applied through OR gate OR1 to shift pulse generator 6. In response to shift pulse generation command signal SHM, shift pulse generator 6 produces and supplies shift pulse SH to photoelectric converter 10, thereby shifting the accumulated charges from photosensor array PA to CCD shift register SR. Then, in a similar manner described above, the video signal producer Vs produces image signal OS serially in synchronism with transfer pulses $\phi1$ and $\phi2$ and, in turn, subtracter 4 produces picture element signal (DOS-OS).

During the picture element signal corresponding to the seventh to tenth cells of No.7-No.10 of CCD shift register SR which are covered with the aluminum mask is produced, peak hold circuit 1 is activated by sample and hold signal S/H produced from control circuit 11 to hold a peak value of the picture element signal under the dark condition. The signal held in peak hold circuit 1, which is referred to as a dark current signal, and the signal produced from subtracter 4 are applied to a variable gain amplifier 2 in which the picture element signal corresponding to the eleventh et seq cells of CCD shift register SR is subtracted by the dark current signal, and the subtracted picture element signal is amplified in the variable gain amplifier by an amplification determined by gain control data from gain controller 5. The amplified signal is converted to a digital form in an A/D (analog-to-digital) converter 3 and, in turn, is provided through control circuit 11 to detector 12 as a picture element signal data. At the same time, the gain control data from gain controller 5 is also applied through control circuit 11 to detector 12.

In detector 12, it is first detected whether or not the focus detection is possible, and if the focus detection is possible, an amount of defocus is further detected. Also, a necessary amount of lens shift to bring objective lens 9 to an infocus condition is calculated based on the picture element signal data. The calculated result is applied to a lens drive device 8 which is then activated to drive the objective lens by the calculated amount. Thereafter, until the objective lens is shifted to the infocus position, control circuit 11 is so controlled as to repeat the sequential operation from the generation of integration clear pulse ICGS to the lens drive.

In detector 12, if it is detected that the focus detection is not possible, an index indicating that the focus detection is impossible is displayed through display device 13. If the focus detection is not possible due to the low brightness (LOW LIGHT) of the object, a focus detection using an auxiliary light of the object is carried out in accordance with a command from control circuit 11, which determines whether or not the auxiliary light illumination is necessary.

Figure 9:
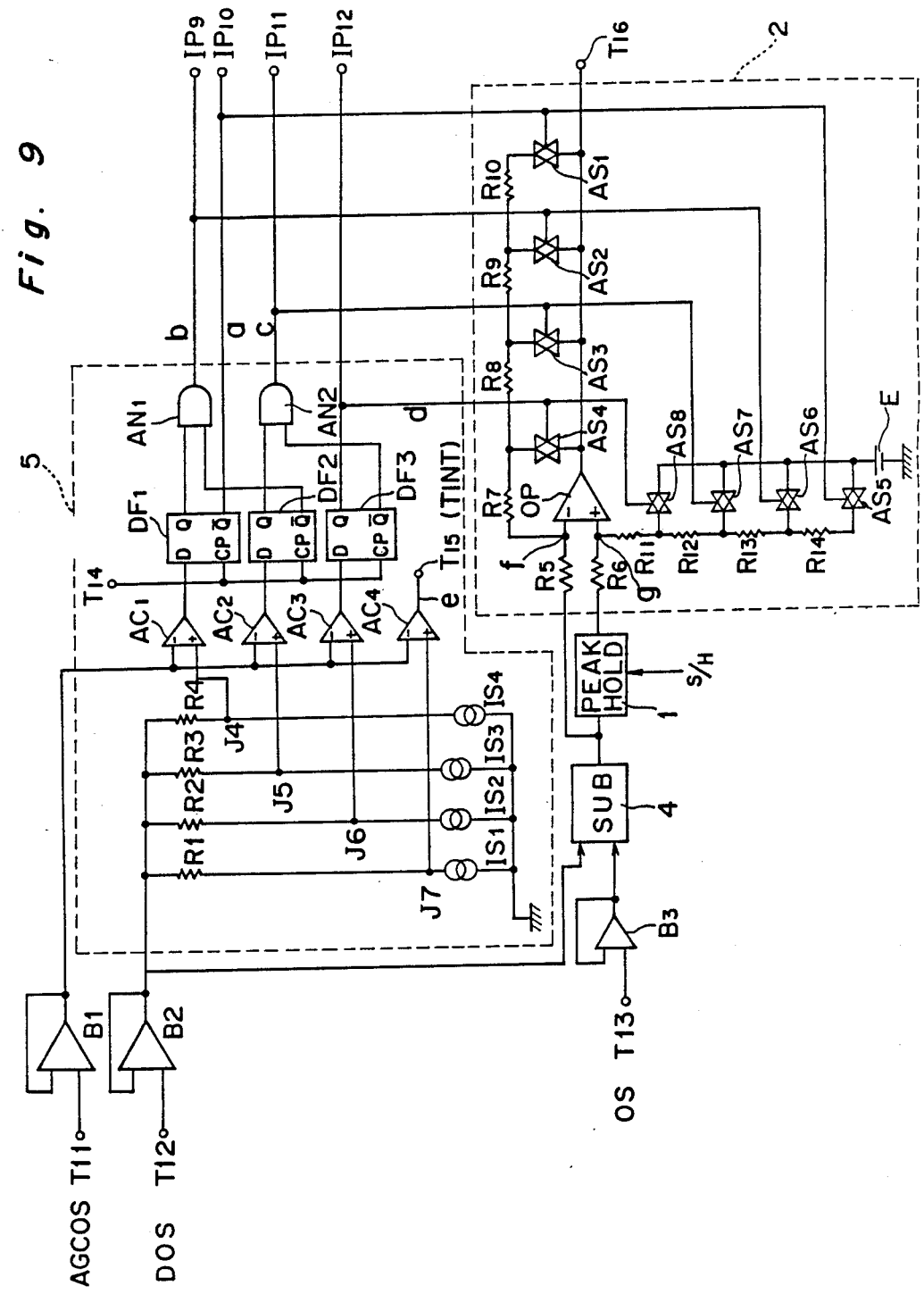
FIG. 9 is a detailed circuit diagram of a gain control circuit and a gain variable amplifier shown in FIG. 8.

Referring to FIG. 9, an example of gain controller 5 and variable gain amplifier 2 is shown. In the drawing, T11, T12 and T13 designate terminals which are connected, respectively, to terminals T1, T2 and T3, shown in FIG. 4. A terminal T14 is provided for receiving shift pulse generation command signal SHM which is produced from control circuit 11 after the elapse of the certain time TM1 (32 milliseconds). Terminal T15 is provided for producing signal TINT in the case when the object is so bright that brightness signal AGCOS from brightness monitor circuit MC decreases rapidly and falls in a region E (FIG. 6) before the elapse of the certain time TM1 (32 milliseconds) from the disappearance of the integration clear pulse ICGS. Terminal T16 is provided for producing the picture element signal which has been amplified by variable gain amplifier 2. The signal produced from terminal T16 is applied to A/D converter 3. In FIG. 9, reference characters B1, B2 and B3 designate buffer circuits. Subtracter 4 is for subtracting image signal OS from reference signal DOS and peak hold 1 is provided for holding the peak value of the dark current signal.

First, gain control circuit 5 is described. The circuit is provided with comparators AC1, AC2, AC3 and AC4 to detect a level of voltage drop of brightness signal AGCOS from brightness monitoring circuit MC after the disappearance of the integration clear pulse ICGS. The inverting inputs of these comparators are connected through buffer B1 to terminal T11 which receives the brightness signal AGCOS. The non-inverting inputs of these comparators AC1, AC2, AC3 and AC4 are connected, respectively, to junction J4 between resistor R4 and the constant-current source IS4, junction J5 between resistor R3 and current source IS3, junction J6 between resistor R2 and constant-current source IS2, and junction J7 between resistor R1 and constant-current source IS1. Resistors R1, R2, R3 and R4 are connected through buffer B2 to terminal T12 at which the reference voltage signal DOS is applied. At junctions J4, J5, J6 and J7, voltages, which are equal to the results of the subtractions of the reference voltages determined by combinations between the resistance values of the resistors R1, R2, R3 and R4 and the current values of constant current sources IS1, IS2, IS3 and IS4, respectively, from the voltage DOS of reference voltage generating circuit RS applied to terminal T12, are generated. By the selection of the resistance values of resistors R1, R2, R3 and R4 and the current values of constant current sources IS1, IS2, IS3 and IS4, different reference voltages can be prepared. The outputs of comparators AC1, AC2, AC3 and AC4 change from "0", to "1" in accordance with the degree of voltage drop of the output voltage AGCOS of brightness monitoring circuit MC, which is applied to terminal T11. The outputs of comparators AC1, AC2 and AC3 are connected to D input of D flip-flops DF1, DF2 and DF3. The shift pulse generation command signal SHM from control circuit 11 is applied to CP inputs of D flip-flops DF1, DF2 and DF3 through terminal T14 for storing the data applied to D input of flip-flops DF1, DF2 and DF3. More specifically, after the elapse of the certain time TM1 (32 milliseconds) from the negative edge of the integration clear signal ICGS, shift pulse generation command signal SHM is applied through terminal T14 to CP inputs of flip-flops DF1, DF2, and DF3, whereby D flip-flops DF1, DF2 and DF3 store and generate from Q terminals thereof outputs which have been transmitted from comparators AC1, AC2 and AC3. At the same time the $\bar{Q}$ terminals produce an inverse of the signals produced from the Q terminals. An output signal e (signal TINT) of comparator AC4 is outputted through terminal T15 in the case when the object is so bright that brightness signal AGCOS from brightness monitor circuit MC decreases rapidly and falls in a region E (FIG. 6) before the elapse of the certain time TM1 (32 milliseconds) from the disappearance of the integration clear signal ICGS.

AN1 is an AND gate, which is connected at its one input with the Q terminal of D flip-flop DF1 and at its other input with the $\bar{Q}$ output of D flip-flop DF2. AN2 is an AND gate, which is connected at its one input with the Q terminal of D flip-flop DF2 and at its other input with $\bar{Q}$ terminal of D flip-flop DF3. Outputs b, c of AND gates AN1 and AN2, output a of $\bar{Q}$ terminal of D flip-flop DF1, output d of Q terminal of DF3, and output e of comparator AC4 are defined as the output of gain control circuit 5. Accordingly, signals a, b, c, d and e represent zones A, B, C, D and E (FIG. 6) which indicate the brightness level detected by monitor photodiode MP. Signals a, b, c, d and e and the corresponding zones are given in Table 1 below.

TABLE 1

| Zones | Signals | | | | |
|---|---|---|---|---|---|
| | a | b | c | d | e |
| A | 1 | 0 | 0 | 0 | 0 |
| B | 0 | 1 | 0 | 0 | 0 |
| C | 0 | 0 | 1 | 0 | 0 |
| D | 0 | 0 | 0 | 1 | 0 |

TABLE 1-continued

| Zones | Signals | | | | |
|---|---|---|---|---|---|
| | a | b | c | d | e |
| E | 0 | 0 | 0 | 1 | 1 |

Upon receipt of signals a, b, c and d, the gain of variable gain amplifier 2 is determined in a manner described below.

In variable gain amplifier 2, OP is an operational amplifier having its input terminals f and g respectively connected to subtracter 4 and peak hold circuit 1 through input resistors R5 and R6. Resistors R7 through R14 are provided for setting the amplification factor of operational amplifier OP. When the resistance value of each of resistors R5, R6, R7, R8, R11 and R12 is r, resistors R9 and R13 each has the resistance value of 2r, and resistors R10 and R14 each has the resistance value of 4r. AS1 through AS8 are analog switches. Analog switches AS1 through AS4 are provided to determine the feedback resistance by selectively connecting resistors R7 through R10 between output and inverting input of operational amplifier OP in accordance with the outputs a, b, c and d. Analog switches AS5 through AS8 are provided to determine the biasing resistance by selectively connecting resistors R11 through R14 between the non-inverting input of operational amplifier OP and ground through a suitable voltage source E in accordance with the outputs a, b, c and d. For the HIGH level signal produced from each of outputs a, b, c and d, the analog switches which are conducted, and the selected resistors used for determining the feedback resistance and the biasing resistance are shown in Table 2 below together with the obtained gain.

TABLE 2

| Signal | Analog SW which conduct | Selected Resistor | Gain |
|---|---|---|---|
| a | AS1, AS5 | R7-R10, R11-R14 | 8 |
| b | AS2, AS6 | R7-R9, R11-R13 | 4 |
| c | AS3, AS7 | R7, R8, R11, R12 | 2 |
| d | AS4, AS8 | R7, R11 | 1 |

Figure 10:
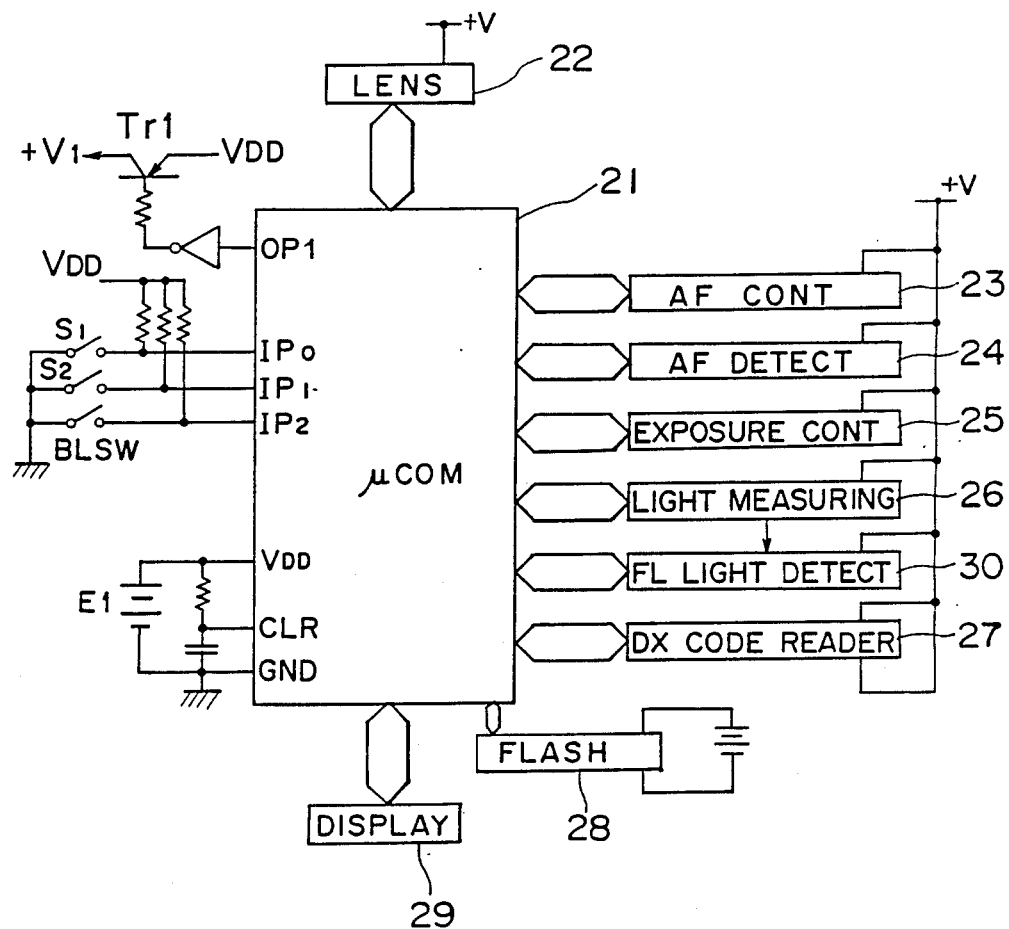
FIG. 10 is a block diagram for controlling a camera employing the light measuring device according to the present invention.

Referring to FIG. 10, a block diagram of a circuit for controlling the operation of a camera employing a light measuring device according to the present embodiment is shown. Reference number 21 designates a microcomputer for controlling the total operation of the camera, and 22 is an interchangeable lens in which a ROM is incorporated for carrying various lens data intrinsic to the specific type lens. The data stored in the ROM of the lens can be read into the camera by commands from the microcomputer. Reference number 23 designates an autofocus control portion containing a motor and a controller for driving the lens in response to command signals from the microcomputer, and 24 is an autofocus detector corresponding to a circuit enclosed by a dotted line 15 in FIG. 8, but excluding control circuit 11. Reference number 25 designates an exposure control portion which controls a shutter and an aperture in accordance with the data obtained from microcomputer 21, 26 is a light measuring portion including a light receiver which measures light from an entire view of photographing frame, 30 is a fluorescent light detector for detecting whether or not a source of light contains a fluorescent lamp, and 27 is a DX code reader for reading a DX code depicted on a film container. DX code carries various information of the film. Reference number 28 designates a flash device which can be detachably mounted on the camera body and has an auxiliary light emitter from which an auxiliary light is emitted for use in the focus detection, and 29 designates a display for displaying photographing condition and focus detection condition. Reference character S1 is a shutter release switch which closes upon half way depression of a shutter release button, S2 is a switch which closes upon full depression of the shutter release button, and BLSW is a switch which can be manually operated, if desired, when using a blue-flat light source which produces blue light for maintaining the light intensity constant regardless of increase of the wavelength, in combination with a primary light source which emits light having intensity that increases relatively to the increase of the wavelength.

Figure 11:
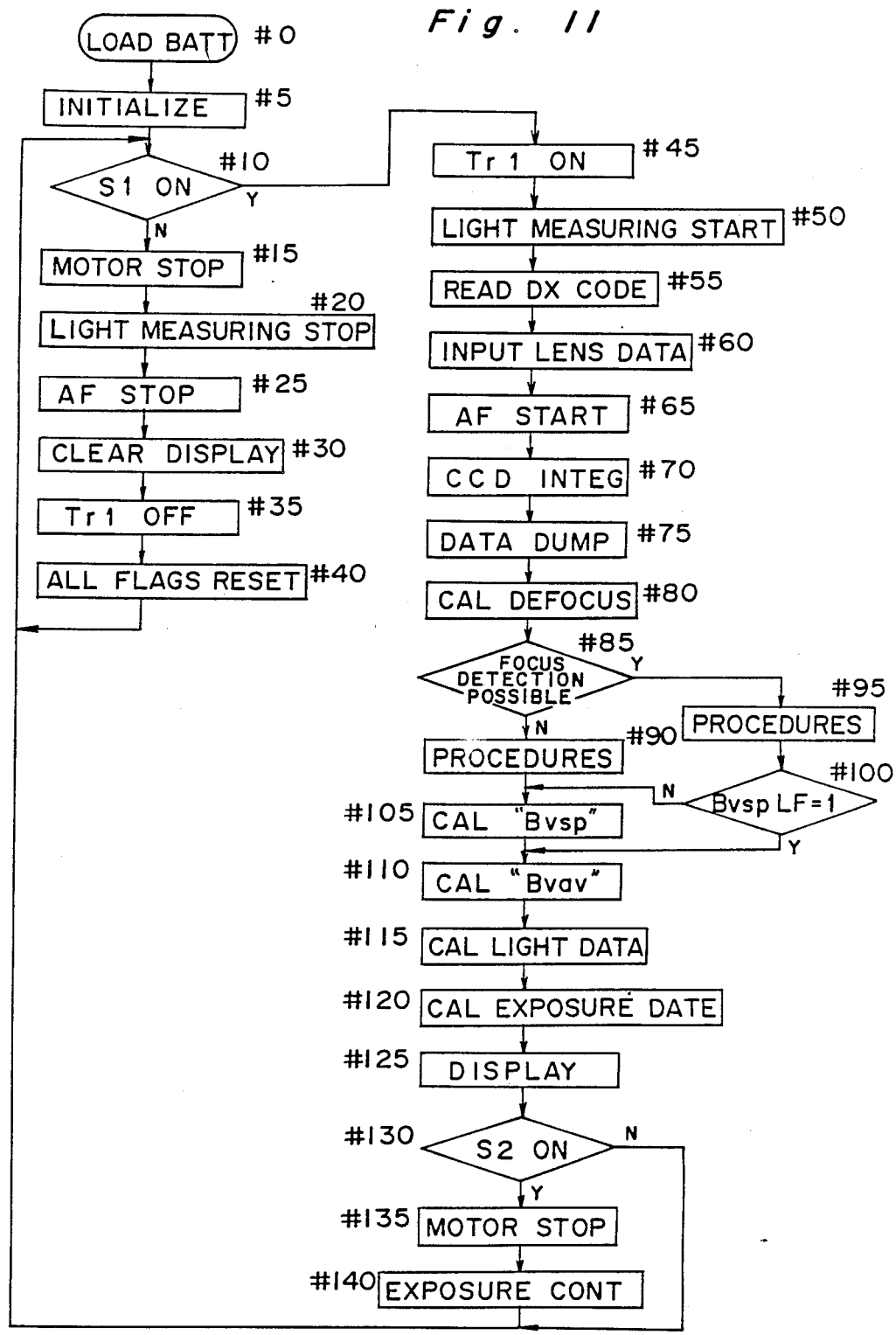
FIG. 11 is a flow chart showing an operation of a microcomputer shown in FIG. 10.

Referring to FIG. 11, a flow chart showing the operation of microcomputer 21 is illustrated. When a battery E1, serving as a power source for the entire circuit, is loaded, a terminal CLR receives a HIGH level signal, thereby enabling microcomputer 21 to operation from step #0. Then, in microcomputer 21, input/output terminal, internal register, and flags are all initialized (step #5) and, thereafter, it is detected whether or not the photographing switch S1 is on (step #10).

If switch S1 is off, the supply of the clock pulse to autofocus detector 24 is cut off (hardware control), and a motor that drives lens stops (step #15). Also, the light measuring and the focus detection are stopped (steps #20–#25). Furthermore, the display is cleared, transistor Tr1 is turned off, and all the flags are reset (steps #30–#40). Then, the program returns back to step #10.

If switch S1 is on at step #10, the clock pulse is supplied to autofocus detector 24 (hardware control), and transistor Tr1 turns on (step #45). Accordingly, a power is supplied to the circuits. Then, the light measuring starts (step #50), and the film data is inputted by reading the DX code and lens data is inputted from ROM in the interchangeable lens (steps #55 and #60). A manner for reading and inputting these data is fully disclosed, for example, in U.S. Pat. No. 4,636,624 assigned to the same assignee as the present The data transmitted from the lens are for example, a fully opened aperture value, a type of the lens whether the focus detection is possible a fully opened aprrture value under a condition that the lens is in nearest focusing condition, and a conversion coefficient (KL) for use in calculating an amount of rotation of the motor to drive the lens until the lens is set in an infocus condition.

Then, at step #65, autofocus operation starts, and at step #70, the charge integration in the CCD is carried out. When the charge integration completes, the image data is taken into the microcomputer for calculation of a defocus amount (steps #75 and #80). The calculated result is used for detecting whether or not the focus detection is possible. If the focus detection is not possible, certain procedures, which will be described later in connection with FIG. 12b, are carried out (step #90) and then, a spot brightness value Bvsp within a frame and an average brightness value Bvav of the frame are detected (steps #105 and #110). On the contrary, if the focus detection is possible, certain procedures, which will be described later in connection with FIG. 12b, are carried out (step #95) and then, it is detected whether or not the spot brightness value Bvsp is locked (or fixed). If it is locked, the program goes to step #110 to detect the average brightness value Bvav. If it is not locked, the program goes to step #105 to detect the spot brightness value Bvsp, and then to step #110 to detect the average brightness value Bvav. Then, using the spot brightness value Bvsp and average brightness value Bvav, an exposure brightness value is calculated (step #115), and an exposure calculation is further carried out to obtain an exposure value Ev (step #120). The calculated results are displayed (step #125).

Then, at step #130, it is detected whether the shutter release switch S2 is turned on, or not. If it is turned on, the motor for driving the lens is stopped (step 135), and the exposure control is carried out (step #140). Thereafter, the program returns back to step #10. If switch S2 is turned off at step #130, the program directly returns back to step #10.

Figure 12A:
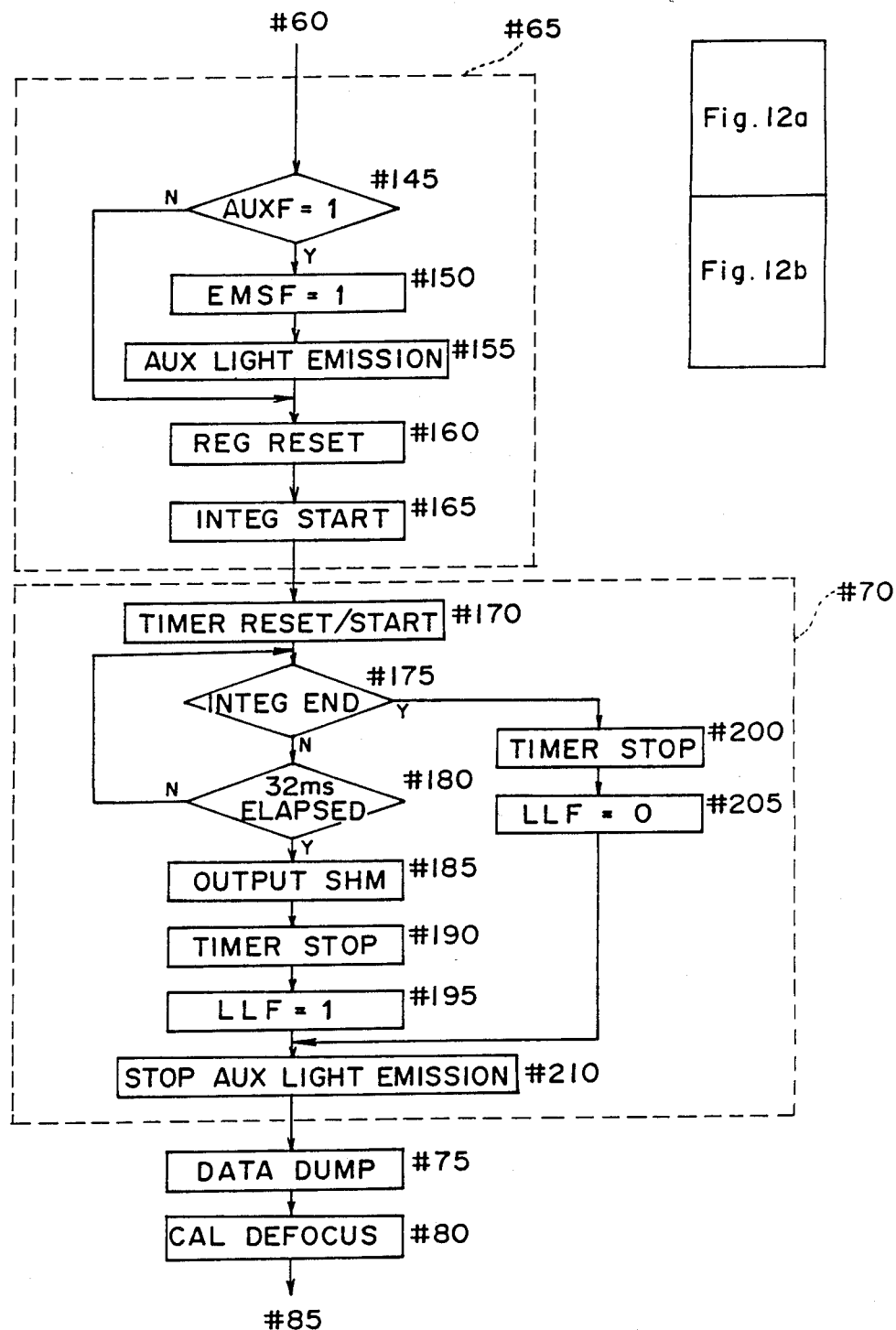
FIGS. 12a and 12b, taken together as shown in FIG. 12, are a flow chart showing a detail of a number of steps shown in FIG. 11.
Figure 12B:
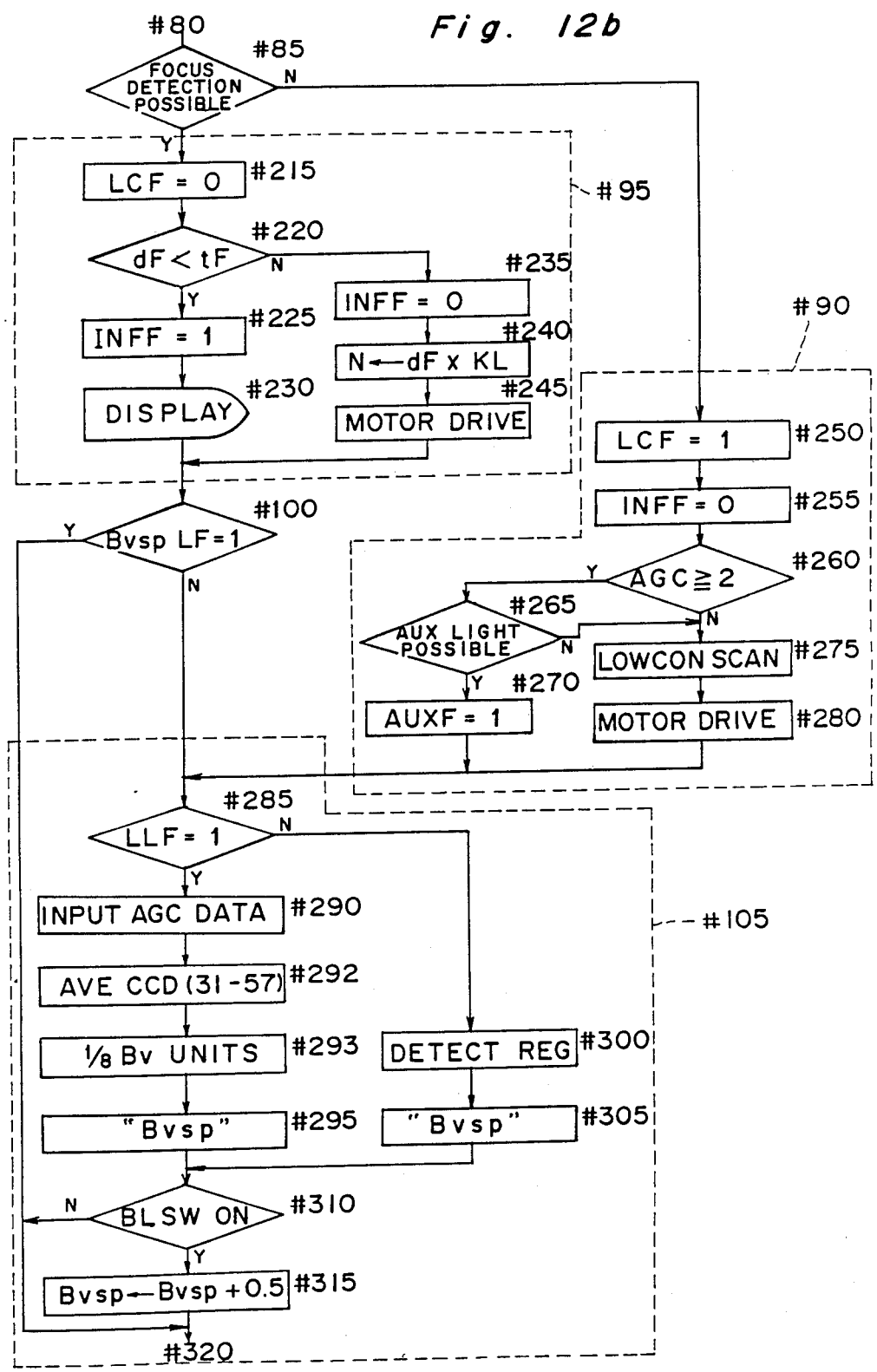

Referring to FIGS. 12a and 12b, above described steps #65, #70, #90, #95 and #105 are shown in detail. Step #65 for starting the autofocus operation includes steps #145–#165. At step #145, it is detected whether or not an auxiliary light flag AUXF is set indicating that the auxiliary light will be emitted (auxiliary light emission mode). If the auxiliary light flag is not set, the program jumps to step #160, and if it is set, the program goes to step #150 at which an emission flag EMSF is set and then to step #155 at which the auxiliary light emission is effected. Then, at step #160, a counter, defined by a register, for use in measuring the spot brightness value is reset.

Here, the measuring of the spot light measuring using the monitor light receiver MP will be described.

In response to the start of the integration (step #165), the counter starts to count up time at the rate of 2 microseconds. The counted result represents the spot brightness value, if the integration ended before the maximum integration time TMl (32 milliseconds). If the integration continued for the full available time, 32 milliseconds, the spot brightness value can be obtained from the output of the monitor light receiver MP. In one preferred embodiment, the light receiver output signal is obtained by the use of AGC data for amplifying the integration data from the CCD and the image signal. Examples of the obtained spot brightness value using the counted result are shown in Table 3, and examples of the obtained spot brightness value using the AGC data are shown in Table 4, below.

TABLE 3

| Bit | Spot Brightness Value (Bv) | Integration Time |
| --- | --- | --- |
| a15 | — | — |
| a14 | — | — |
| a13 | 3 | 16 milliseconds |
| a12 | 4 | 8 milliseconds |
| a11 | 5 | 4 milliseconds |
| a10 | 6 | 2 milliseconds |
| . | . | . |
| . | . | . |
| . | . | . |
| a5 | 11 | 64 microseconds |
| a4 | 12 | 32 microseconds |
| a3 | 13 | 16 microseconds |
| a2 | — | 8 microseconds |
| a1 | — | 4 microseconds |
| a0 | — | 2 microseconds |

TABLE 4

| Spot Brightness Value (Bv) | AGC |
| --- | --- |
| below −1 | × 8 |
| 0 | × 4 |

TABLE 4-continued

| Spot Brightness Value (Bv) | AGC |
|---|---|
| 1 | × 2 |
| 2 | × 1 |

In these tables, the brightness values are given by an A.P.E.X. system. As indicated in Table 3, the spot brightness value Bv ranging between 13 and 3 is detected by the use of counter result and is expressed by the use of 16 bit long data, as explained below. Of the 16 bit long data, the highest bit that carries "1" represents the brightness value of integer as shown in Table 3. For example, (0001 0000 0000 0000)

carrying "1" at the bit place of a12 indicates that the brightness value is 4. Similarly, (000 1000 0000 0000)

indicates that the brightness value is 5. A first bit place following the highest bit that carries "1", represents $\frac{1}{2}$ Bv, a second bit place following the highest bit that carries "1" represents $\frac{1}{4}$ Bv, and a third bit place following the highest bit that carries "1" represents $\frac{1}{8}$ Bv Thus, for example, (0001 0100 0000 0000)

represents brightness value of $4\frac{1}{4}$. Similarly, (000 1001 0000 0000)

represents brightness value of $5\frac{1}{8}$. In this manner, the brightness value Bv between 3 and 13 can be expressed as precise as $\frac{1}{8}$ Bv using four bit places in a 16 bit long data.

The spot brightness value Bv ranging between 2 and −1 as indicated in Table 4 is detected by the use of AGC data and an average of the CCD outputs from cells No. 31–No. 57 (FIG. 7) located immediately below the monitor light receiver MP. In this case, the brightness value of integer can be obtained from the AGC data as indicated in Table 4, and the brightness value of fraction such as $\frac{1}{8}$ is obtained from the CCD output in such a manner described below. A range between the maximum and minimum levels of the output signal as produced from variable gain amplifier 2, more specifically from terminal T16, is divided into seven levels which are weighted, from low to high levels, as $\frac{1}{8}$ Bv, 2/8 Bv, $\frac{3}{8}$ Bv, 4/8 Bv, $\frac{5}{8}$ Bv, 6/8 Bv, and $\frac{7}{8}$ Bv. It is found which one of the seven levels do the output signal from variable gain amplifier 2 belongs, and the fraction weighted to the found level is added to the integer.

An alternative way to express the fraction part of the brightness value is accomplished by using the AGC data 1, 2, 4 which are weighted as 1.5, 0.5, −0.5. In this case, a reference voltage which is equal to $\frac{1}{2}$ of the maximum and minimum output voltages in CCD cells No. 31–No. 57 is compared with an average of the same CCD cells No. 31–No. 57, and a difference therebetween is obtained. A range between the maximum possible difference and the minimum possible difference is divided into seven levels which are weighted, from low to high levels, as $\frac{1}{8}$ Bv, 2/8 Bv, $\frac{3}{8}$ Bv, 4/8 Bv, $\frac{5}{8}$ Bv, 6/8 Bv, and $\frac{7}{8}$ Bv. A corresponding fraction value is found for the obtained difference and is used to correct the above brightness values 1.5, 0.5, −0.5.

Referring back to FIG. 12a, after the counter is reset (step #160), integration clear signal ICGS is applied to photoelectric converter 10 so that each photosensor is reset to the initial condition and, at the same time, the brightness signal AGCOS from brightness monitor circuit MC is recovered to the initial condition holding the voltage level approximately equal to the source voltage level. Then, when the integration clear signal ICGS disappears (step #165), each photosensor in the photoelectric converter 10 and the monitor photodiode MP start the light integration and, at the same time, the counter starts to count time. As has been described above, during the integration, the register used for the timer counts up at the rate of 2 microseconds.

If the object has a certain level of brightness that the brightness signal AGCOS from brightness monitor circuit MC reaches a predetermined level before the certain time TM1 (32 milliseconds) from the start of the integration, a signal TINT is provided from gain control circuit 5 to the microcomputer in a manner described above, thereby indicating the end of the integration. In response to the signal TINT, the program advances from step #175 to step #200 for stopping the timer. Then, at step #205, a flag LLF indicating the low brightness is reset, thus informing the microcomputer that the object has a certain level of brightness. Thereafter, the program goes to step #210 at which the auxiliary light emission ends.

On the contrary, if the object has a low brightness that the brightness signal AGCOS does not reach a predetermined level even after counting the certain time of 32 milliseconds, the program advances from step #180 to step #185 for producing the shift pulse generation command signal SHM, and then, the timer stops counting (step #190), Then, at step #195, flag LLF indicating the low brightness is set, and at step #210, the auxiliary light emission ends. Thereafter, the data from CCD are applied to the microcomputer (#75), and in the meantime, a sample/hold signal is applied to peak hold circuit 1 for holding the dark current data.

Based on the CCD data, an amount of defocus dF is calculated (step #80), and based on the calculated result, it is detected whether or not the focus detection is possible (step #85, FIG. 12b), i.e., a sufficient contrast is obtained. Of the focus detection is possible, the program goes to step #215 at which a low contrast flag LCF is reset for the indication that the object has a sufficient contrast. Then, at step #220, it is detected whether or not the amount of defocus dF is less than a predetermined tF of the defocus. If defocus amount dF is less than predetermined amount tF, it is so deemed that the image is properly focused and, accordingly, infocus flag INFF is set at step #225 and the infocus condition is displayed at step #230. If, on the other hand, defocus amount dF is greater than the predetermined amount tF, it is so deemed that the objective lens is not properly focused and, accordingly, infocus flag INFF is reset at step #235. Then, at step #240, a multiplication of defocus amount dF times conversion coefficient KL is carried out to obtain a product N which represents a number of rotation of a motor to bring the lens to an infocus position. Then, at step #245, the motor drives the lens. Thereafter, the program goes to step #100 at which it is detected whether or not flag BvspLF indicating that the spot brightness value is locked is set. If flag BvspLF is set, the program goes to step #320 (FIG. 13), and if it is cleared, the program goes to step ##285.

At step #85, if it is detected that the focus detection is not possible, the program goes to step #250 for setting low contrast flag LCF, and further to step #255 for clearing infocus flag INFF. Then, at step #260, it is detected whether a gain data AGC is equal to or greater than "2", or not. If gain data AGC is less than "2", it is so determined that the object has a sufficient brightness, but the contrast is low because the objective lens is in greatly out of focus condition. Thus, at step #275, a low contrast scan is commanded and, at step #280, the motor is activated to scan the lens between infinite and near focus positions in an attempt to obtain more contrast. If gain data AGC is equal to or greater than "2", it is detected whether or not an auxiliary light can be emitted (step #265). Actually, this detection is done by a signal obtained from the flash device mounted on the camera body. If the flash device is ready, it is so detected that the auxiliary light can be emitted and, therefore, the program goes to step #270 to set an auxiliary light flag AUXF. If the flash device is not ready, it is so detected that the auxiliary light can not be emitted and, thus, steps #275 and #280 are carried out in an attempt to obtain more contrast. Then, the program goes to step #285.

At step #285, low brightness flag LLF indicating the low brightness is examined. If low brightness flag LLF is set, AGC data is inputted (step #290) to obtain the integer part of spot brightness value Bvsp, while an average of the CCD data from cells No. 31–No. 57 (already obtained at step #75) is calculated (step #292) to further calculate the fraction part of spot brightness value Bvsp, which is a multiple of ⅛ Bv (step #293). If low brightness flag LLF is not set, the contents of the register used for counting the integration time is detected (step #300), and then, the spot brightness value Bvsp is calculated (step #305). Then, at step #310, it is detected whether or not blue-flat light switch BLSW is on. If switch BLSW is on, "0.5" is added to the calculated spot brightness value Bvsp (step #315) and the program goes to step #320, but if it is off, the program directly goes to step #320.

Figure 13:
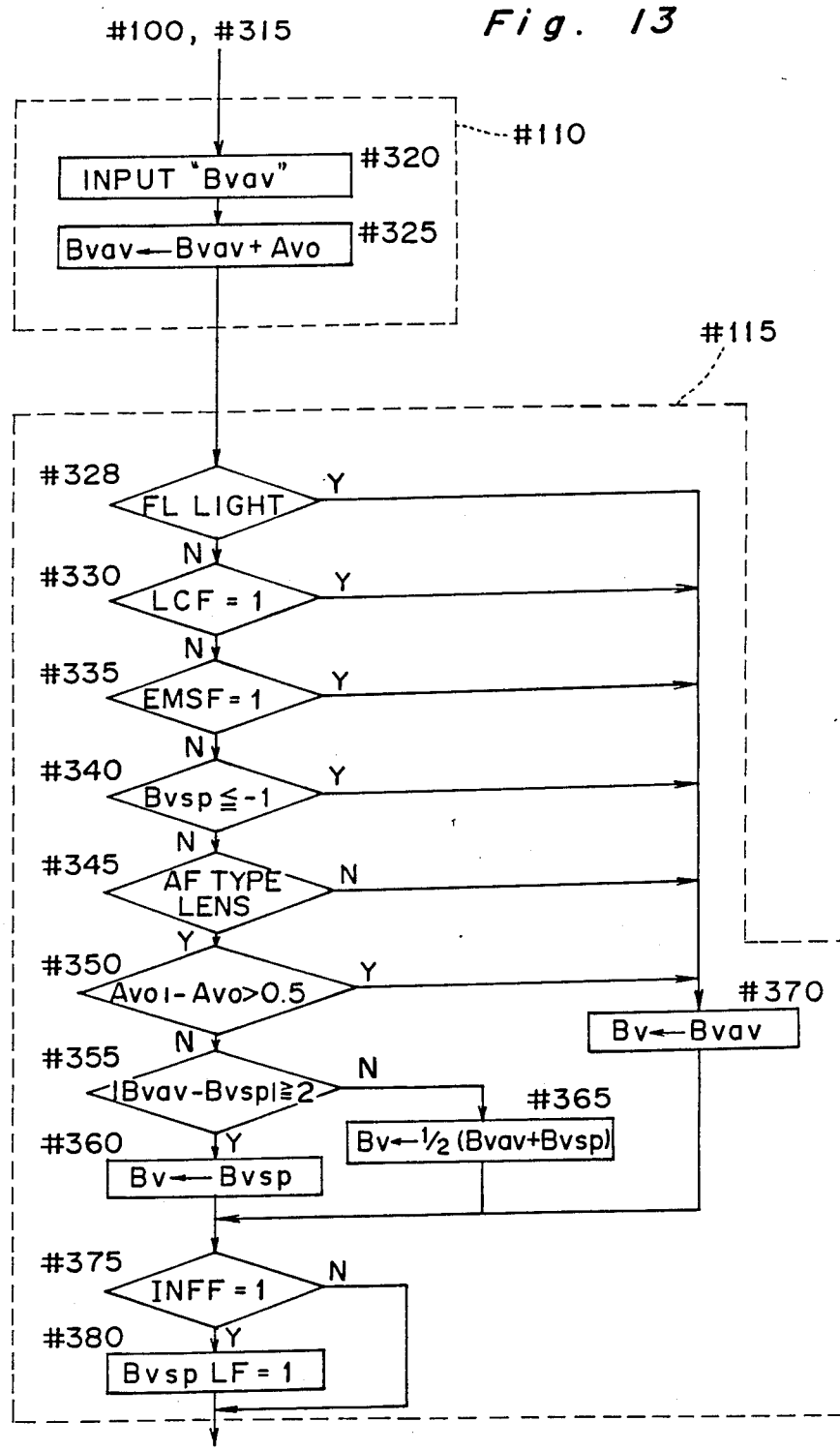
FIG. 13 is a flow chart showing a detail of steps #110 and #115 shown in FIG. 11.

At step #320, as shown in FIG. 13, a provisional average brightnes value Bvav is inputted from light measuring portion 26, and at step #325, a corrected average brightness value Bvav is obtained by adding the fully opened aperture value Avo to the provisional average brightness value Bvav. The corrected average brightness value Bvav is used in the following cases.

(i) A case when the low contrast flag LCF is set (step #330). This is the case when the focus detection is not possible. In this case, the point where the spot light measuring is being aimed is not sure and, therefore, it may happen that the spot brightness value is detected from a point not intended.

(ii) A case when the light emission flag EMSF is set (step #335) indicating that the auxiliary light has been emitted. In this case, since the auxiliary light emits light in near infrared region toward the object, the result will not indicate a precise brightness.

(iii) A case when the spot brightness value Bvsp has an amount less than −1 (step #340). In this case, the object is so dark that there will be hardly any difference between the average brightness value and the spot brightness value and, also, from a practical view point, it is very difficult to detect the brightness value under the brightness value of −1.

(iv) A case when a lens for which the focus detection is impossible, is mounted (#345). In the optical arrangement shown in FIG. 3, if the fully opened aperture value becomes great, a part of incident light on the image sensor array PA may be blocked so that the light impinging on the monitor photodiode MP may change with respect to the same object while the aperture size being reduced. The same can be said not only to the lens having a great fully opened aperture size, but also to a telephoto lens having catadioptric type lens system.

(v) A case when the difference between the effective aperture value Avo (nominal fully opened aperture value Avo) obtained when the lens is in infinite focusing condition and the effective aperture value Avol obtained when the lens is in nearest focusing position is less than 0.5 Ev (step #350). Unless the incident light is partially blocked by the aperture, the monitor photodiode measures the spot brightness value Bvsp of the object with no error regardless of what the fully opened aperture value is. Therefore, in the case when the exposure control is carried out by using the number of stop down steps effected from the fully opened aperture, the above difference will result in an error in the exposure control between the case when the lens is in infinite focusing condition and the case when the lens is in nearest focusing condition.

(vi) A case when the photograph is taken under the fluorescent lamp (step #328). The fluorescent lamp turns on and off at twice the frequency of the AC power supplied to the fluorescent lamp. Therefore, if the spot measuring is effected during a period less than one on/off cycle of the fluorescent lamp, the measured result will not be the same, and thus will result in the error exposure control.

Thus, in the above described six cases (i)–(vi), it is so determined that the spot measuring has a less reliability and, therefore, the program goes to step #370 for using the corrected average brightness value Bvav, and then to step #375. In the cases other than the above described six cases, the program goes to step #355 at which an absolute of a difference between the spot brightness value Bvsp and the average brightness value Bvav is equal to or greater than 2. If the difference is equal to or greater than 2, it is so detected that the object is in backlighting condition, and thus, the program goes to step #360 for storing the spot brightness value Bvsp as the brightness data to be used in the exposure control. In this case, it is possible to an intermediate value between the spot brightness value Bvsp and the average brightness value Bvav, but weighting the spot brightness Bvsp more than 50 percent. On the contrary, if the difference is less than 2, an average between the spot brightness value Bvsp and the average brightness value Bvav is stored (step #365) for use in the exposure control.

Then, at step #375, the infocus flag INFF is detected. If the infocus flag INFF is set, the program goes to step #380 at which lock flag BvspLF for locking the spot brightness value Bvsp set so as to prevent the spot brightness value Bvsp data from being changed. If the infocus flag INFF is not set, the program skips step #380 and goes to step #120.

In the above described embodiment, the average of signals from CCD cells of No. 31–No. 57 is used to obtain the fraction part (⅛ Bv units) of the brightness value, but instead is it to use an intermediate value between the maximum and minimum of the signals from CCD cells of No. 31–No. 57.

Figure 14:
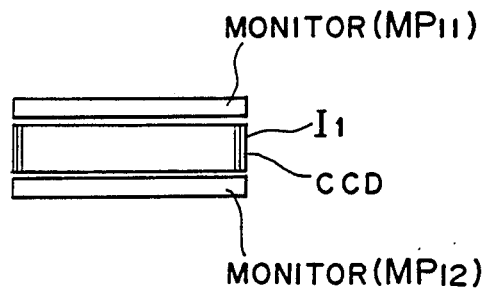
FIG. 14 is a plan view of a light receiver used in a light measuring device using an infocus detecting device according to a second embodiment of the present invention.

Referring to FIG. 14, a plan view of one image sensor I1 and monitor light receivers MP11 and MP12 provided adjacent and along the opposite sides of image sensor I1 are shown, according to a second embodiment. When compared with the first embodiment, an additional monitor light receiver MP12 is provided and, also, each monitor light receiver is made greater (by n times), so as to enlarge the area, eventually by 2n times, for detecting the spot brightness value. The enlargement of the spot detecting area is advantageous particularly when a bright light source should come into the spot detecting area. In such a case, the spot brightness value will be less influenced by the bright light source, thereby enabling more appropriate light measuring. The employment of the additional monitor light receiver MP12 will result in a modification of monitor circuit MC in a manner described below.

Figure 15:
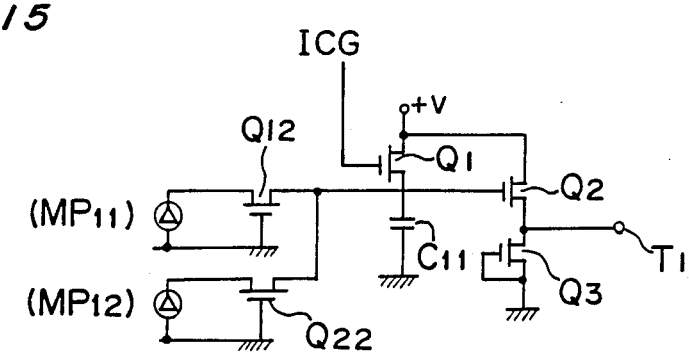
FIG. 15 is a circuit diagram of a brightness monitor circuit used in the second embodiment.

Referring to FIG. 15, a modification of monitor circuit MC is shown which is capable of receiving spot brightness signals from two monitor light receivers MP11 and MP12. When compared with the monitor circuit MC of FIG. 4, the circuit of FIG. 15 further has an FET Q22 coupled to the second monitor light receiver MP12. Other circuit organization is the same as the circuit of FIG. 4, but the capacitance of capacitor C11 is greater than that of FIG. 4 by 2n times, in compliance with the enlargement of the light receiving area. To this end, it is possible to add another capacitor parallel to capacitor C11.

Figure 16:
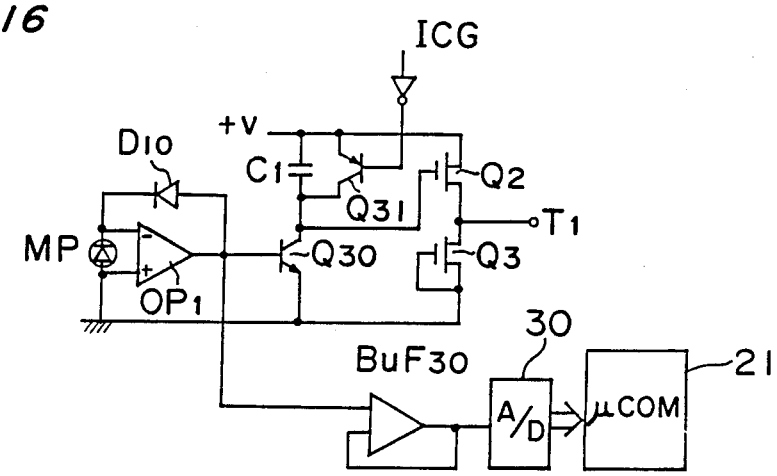
FIGS. 16 and 17 are circuit diagrams showing modifications of the brightness monitor circuit.

In the previous embodiment, the spot brightness value has been obtained by using the integration time and the gain of the CCD data. Alternatively, it is possible to obtain the spot brightness value by logarithmically compressing the photocurrent obtained from the monitor light receiver and, then, converting the compressed current to a voltage. To this end, a circuit such as shown in FIG. 16 may be employed in which monitor photodiode MP is connected between two inputs of operational amplifier OP1 and a compression diode D10 is connected between the output and one input of operational amplifier OP1. The output of operational amplifier OP1 is further connected to transistor Q30 which has its collector connected to a capacitor C1 for storing charges representing the output of the monitor photodiode MP. A switching transistor Q31 connected across capacitor C1 corresponds to FET Q1 shown in FIG. 4. The output of the operational amplifier OP1 is also connected to a buffer BuF30 which is in turn connected through an A/D converter 30 to microcomputer 21. To this end, microcomputer 21 has an additional input terminal for receiving the digital signal representing the spot brightness value. An operation carried out in microcomputer 21 is modified, when compared with the operation shown in FIGS. 12a, 12b and 13, in two points in a manner described below.

(I) Steps #195 and #205 are eliminated and, in compliance thereto, steps #285–#305 are eliminated. Instead, a step for inputting digital signal from A/D converter 30 is added.

(II) Steps #150 and #335 are eliminated. This is because, in the circuit of FIG. 16, no integration is carried out, but the brightness is always monitored. Also, the auxiliary light emission is terminated at the end of the integration. In addition, since the spot brightness data is read in after the defocus calculation is completed, A/D conversion has been carried at least once. Thus, the digital signal will not be influenced by the auxiliary light and, therefore, the above steps are not necessary.

Figure 17:
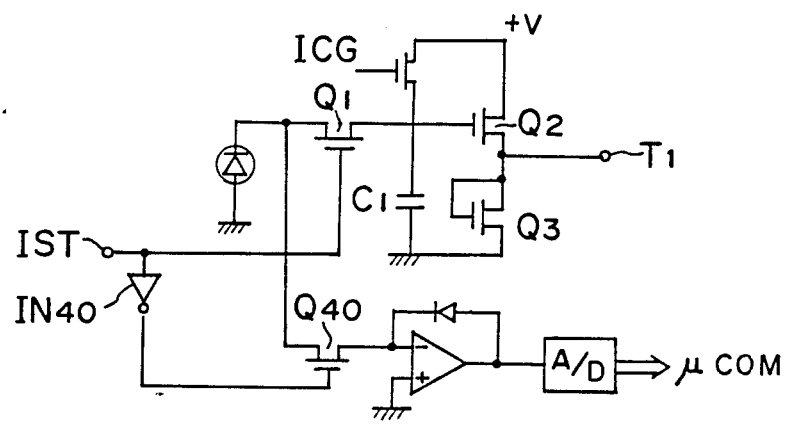

Referring to FIG. 17, another modification of the monitor circuit MC is shown, which is so arranged as to switch the output of light receiver between the time during the integration in the CCD and the time after completing the integration. Microcomputer 21 is so programmed that a switch signal IST takes a LOW level at the start of the integration and a HIGH level at the end of the integration. The operation to be carried out in the microcomputer is the same as that explained in the case of FIG. 16, except that a step for controlling the switch signal IST is added. Also, as to the circuits of FIGS. 16 and 17, it is not necessary to prepare the register for counting time to detect the spot brightness value in the microcomputer.

Figure 18:
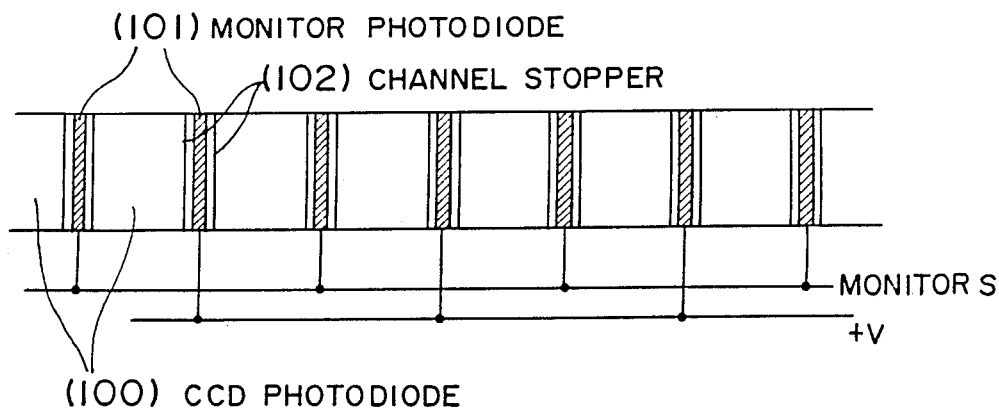
FIG. 18 is a plan view of a light receiver used in a light measuring device using an infocus detecting device according to a third embodiment of the present invention.

Referring to FIG. 18, a modification of the monitor photodiode is shown. A reference number 100 designates a plurality of photodiodes in the CCD, 101 designates monitor photodiodes located between photodiodes 100 with a predetermined spacing. In each spacing, a plurality of channel stopper 102 are provided for preventing the crosstalk between photodiodes 100 and 101.

Figure 19:
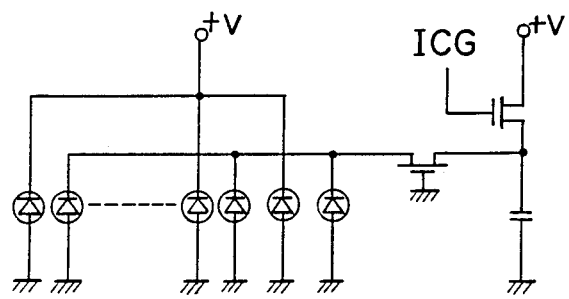
FIG. 19 is a circuit diagram showing an arrangement of a read out circuit of the light receiver of FIG. 18.

The monitor photodiodes 101 may be arranged such that, of all the monitor photodiodes 101, every other monitor photodiodes are connected to a monitor signal line, and the remaining monitor photodiodes are connected to a source line +V at their cathode, so that monitor signals are obtained only from every other monitor photodiodes, and no monitor signal is obtained from monitor photodiodes connected to the source line. This arrangement is taken so as to obtain the total area of the effective monitor photodiodes which is substantially equal to the area of the monitor photodiode MP shown in FIG. 7. Therefore, in accordance with the size of the monitor photodiode, the ratio of the numbers of photodiodes to be used and not to be used may be changed. Also, it may be so arranged that the monitor photodiodes which are not used may be disconnected from the voltage source. FIG. 19 shows an equivalent circuit of the arrangement shown in FIG. 18 together with a circuit for producing the monitor signals. The manner in which the monitor signals are produced is the same as that described above in connection with FIG. 5.

The arrangement of FIG. 18 takes advantages, when compared with that of FIG. 7, as explained below.

According to the arrangement of FIG. 7, the spot on the object from which the CCD cells receive light is different from the spot from which the monitor photodiode receives light. Thus, it may happen that the brightness of the spot aimed by the CCD cells and that aimed by the monitor photodiode have a difference, and this difference will result in problems not only in the light measuring operation, but also in the focus detection operation, as given below.

(a) When viewing at the object through a viewfinder, the photographer sets the marked area X (FIG. 2) in alignment with the spot where he wants to detect, but since there is no specific marking for the area Y, where monitor photodiode MP is located in the arrangement of FIG. 7, monitor photodiode MP may be fixed to a spot having a different brightness than the spot captured by the marked area X. This will lead to an error in the light measuring operation and also in the focus detection operation, but no such error will take place when the arrangement of FIG. 18 is employed. Also, since the monitor photodiodes are located sparsely within the CCD cell alignment, the lights can be detected from a wider angle.

(b) The integration time may not be properly controlled in the case of FIG. 7 arrangement. For example, when the monitor photodiode MP is receiving light having high intensity, but the CCD cells are receiving a light with a relatively low intensity, the integration time as controlled by the output signal of monitor photodiode will be very short, resulting in undesirably low level of the CCD outputs. On the contrary, when the monitor photodiode MP is receiving a light with a low brightness, but the CCD cells are receiving a light with a high intensity, the integration time will be made undesirably long, resulting in the saturation of the CCD outputs. Such disadvantages will not take place in the arrangement of FIG. 18.

Next, a description is directed to a method for producing the brightness signal AGCOS representing the brightness, i.e., for controlling the integration times, using the CCD outputs, and not using the monitor light receiver.

Figure 20:
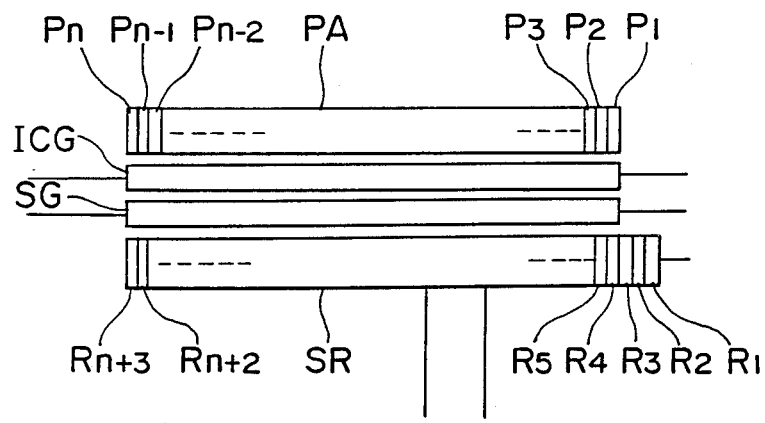
FIG. 20 is a plan view of a light receiver used in a light measuring device using an infocus detecting device according to a fourth embodiment of the present invention.
Figure 21:
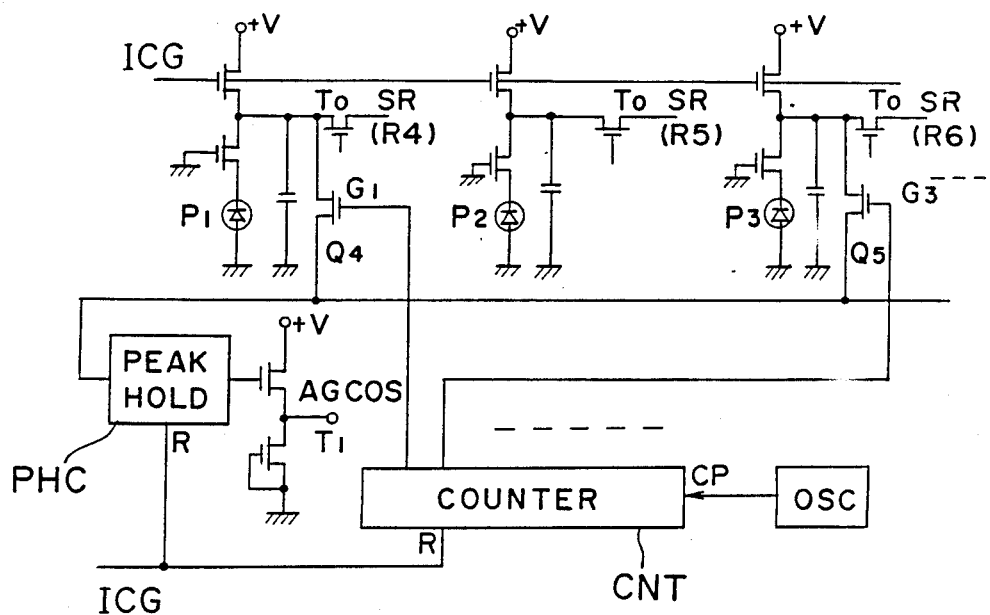
FIG. 21 is a circuit diagram showing an arrangement of a read out circuit of the light receiver of FIG. 20.
Figure 22:
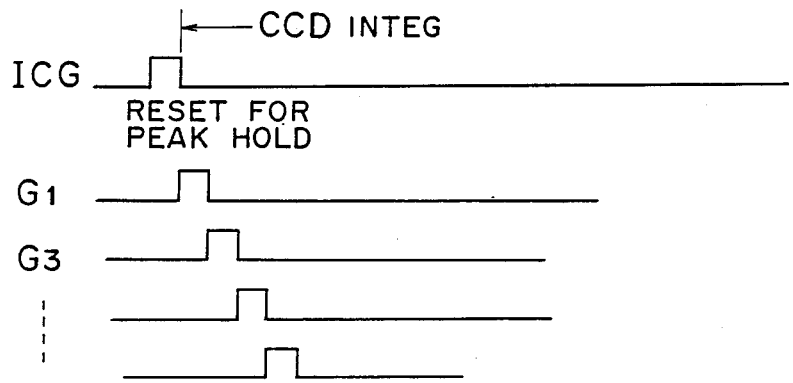
FIG. 22 is a graph showing waveforms of signals obtained from the circuit of FIG. 21.

The arrangement shown in FIG. 20 shows the major part of the photoelectric converter for controlling the integration time without employing the monitor photodiodes, and has the same arrangement as the CCD arrangement shown in FIG. 4. A circuit shown in FIG. 21 is for making a monitor signal from the CCD outputs for use in the gain control circuit 5. In the drawing, analog switches Q4, Q5, ... are coupled to every other CCD cells for sequentially supplying the outputs from every other CCD cells to a peak hold circuit PHC in response to the output signal from counter CNT. It is to be noted that the peak hold circuits PHC holds peaks in the negative direction. FIG. 22 shows pulses G1, G3, ... produced from counter CNT. In response to the integration start signal ICG for the CCD, the counter is reset, and at the same time, peak hold circuit PHC is initialized to hold the source voltage. The CCD outputs from not every one, but from every other cells are sampled so as to provide sufficient sampling time for taking a signal from each CCD cell. In the example shown in FIG. 21, every other CCD cells are sampled, but it is possible to change the sampling rate, for example, it is possible to sample every ten other CCD cells. Since the output level from each CCD photodiode (floating gate output level) becomes low as the brightness becomes higher, the peak hold circuit holds PHC the most negative peak point as obtained from the CCD photodiode receiving the light of highest intensity. Since the scan speed for sampling is made relatively high with respect to the CCD integration time, the time lag in sampling the CCD cells in one end of the CCD array and the CCD cells in the other end thereof can be disregarded. The signal produced from the peak hold circuit PHC is taken out as the brightness signal AGCOS representing the brightness of the image.

When the arrangement of FIG. 21 is employed, the monitor control can be carried out from the CCD output itself, without using any other light receiver, thereby enabling the control of the maximum output from the CCD cells and making it possible to obtain CCD output having a wide dynamic range, resulting in the focus detection with a higher preciseness.

Instead of using the arrangement of FIG. 21, it is possible to use the arrangement of FIG. 18 for effecting the monitor control for each monitor photodiode, but in this case, it is necessary to provide a circuit of FIG. 5 for each photodiode.

Figure 23:
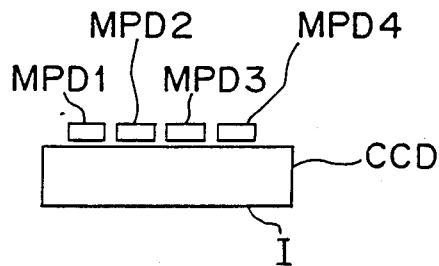
FIG. 23 is a plan view of a light receiver used in a light measuring device using an infocus detecting device according to a fifth embodiment of the present invention.

The idea of obtaining monitor outputs from a number of photodiode segments, as taught in the arrangement of FIG. 21 can be also applied to monitor light receiver MP1 of FIG. 1, and an example of the applied result is shown in FIG. 23.

Figure 24:
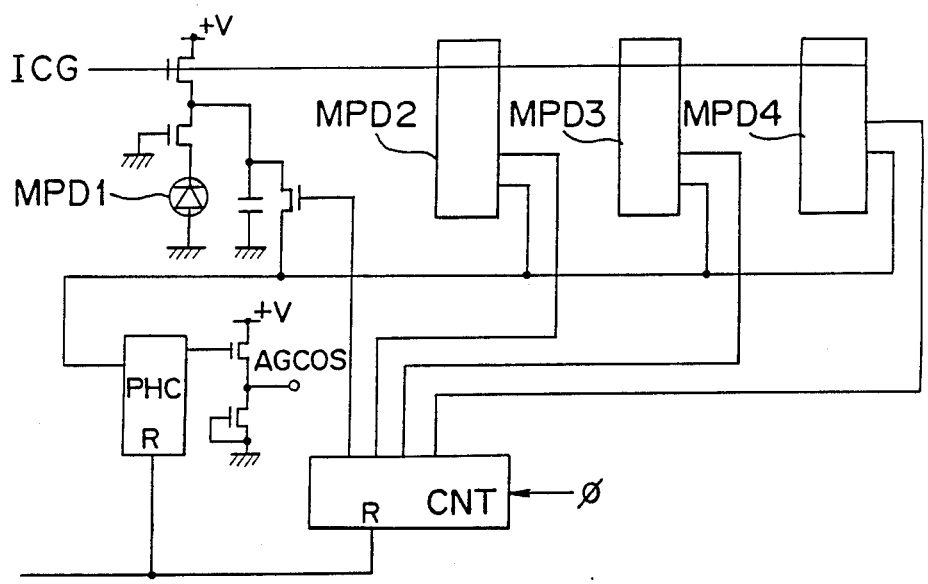
FIG. 24 is a circuit diagram showing an arrangement of a read out circuit of the light receiver of FIG. 23.

Referring to FIG. 23, monitor photodiode MP1 of FIG. 1 is divided into four segments, MPD1-MPD4, which are aligned along the CCD sensor array with a predetermined spacing. As shown in FIG. 24, each segment is connected to a circuit similar to that shown in FIG. 21, and are controlled by sampling signals from counter CNT and the sampled signal having the maximum negative peak is stored in peak holding circuit PHC.

The above idea is also applicable to the arrangement shown in FIG. 18 such that a plurality of, such as four, monitor light receivers are used to provide a plurality of monitoring portions. The output circuit for producing the voltage signal AGCOS can be arranged such as shown in FIG. 24.

Figure 25:
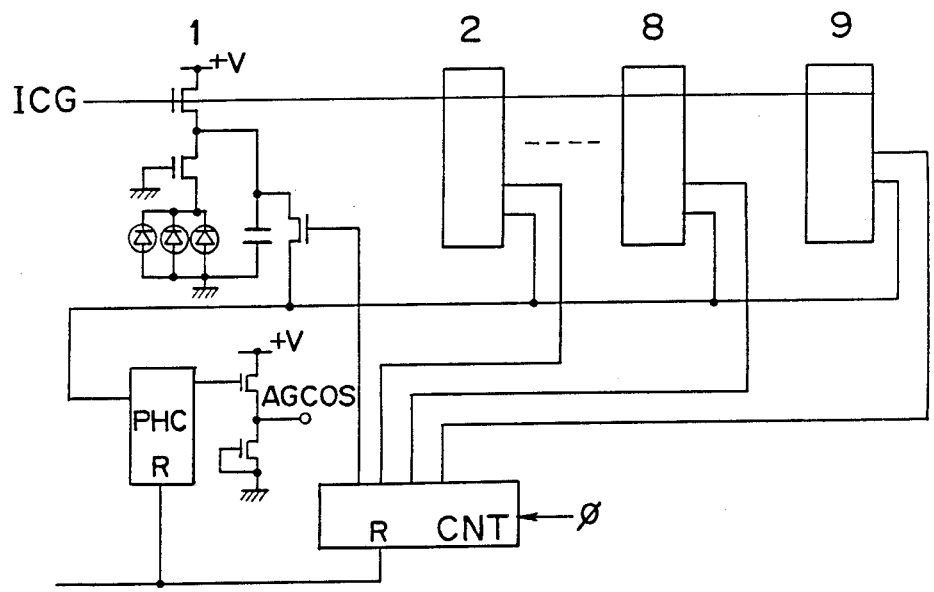
FIG. 25 is a circuit diagram showing a modification of the read out circuit for use in association with the light receiver of FIG. 18.

Next, a method for obtaining a brightness value of the object using the monitor light receiver and CCD outputs will be described. The brightness value is obtained by the detection of integration time in the monitor light receiver, and the obtained brightness value is corrected by the brightness value obtained by the use of CCD outputs. In this case, it is necessary to avoid the saturation of any one of the CCD cells. In order to accomplish this, each CCD cell is provided with an integration time control for producing the brightness signal AGCOS for each CCD cell and the integration time is controlled with the maximum brightness signal AGCOS. For example, each monitor portion for the arrangement of FIGS. 18 and 19 may be provided with a monitor control circuit, or the integration time can be controlled with the photodiode output from each CCD shown in FIG. 21. If the integration time is controlled for each CCD cell, the circuit becomes complicated and expensive. Thus, in the case of FIG. 18, 19 or 21, the integration control circuit is provided not all, but to only the selected CCD cells, or one integration control circuit is provided for a number of CCD cells. In FIG. 25, one monitor portion is provided for three monitor light receivers. The monitored signals are sampled and held in the peak holding circuit PHC in the same manner described above. In FIG. 25, there are nine monitor portions are provided and, therefore, there are 27 CCD cells are monitored. The same arrangement can be adapted to the arrangement of FIGS. 23 and 24. By the above arrangement, it is possible to prevent the CCD output from being saturated.

Next, a manner for obtaining the brightness value using the CCD output will be described. First, the integer part of the brightness value is calculated by counting the integration time in a manner described above in connection with Table 3. Then, an average of the entire CCD output, or an average between the maximum and the minimum CCD output is obtained to calculate the fraction part of the brightness value in a manner described below.

The average as obtained is compared with a center voltage, which is equal to ½ of the maximum and minimum output voltages which the of No. 31-No. 57 produce, to produce a difference therebetween. A range between the center voltage and the maximum voltage is previously divided into seven levels which are weighted, from low to high levels, as ⅛ Bv, 2/8 Bv, ⅜ Bv, 4/8 Bv, ⅝ Bv, 6/8 Bv, and ⅞ Bv. Similarly, a range between the center voltage and the minimum voltage is previously divided into seven levels which are weighted, from high to low levels, as $-\frac{1}{8}$ Bv, $-2/8$ Bv, $-\frac{3}{8}$ Bv, $-4/8$ Bv, $-\frac{5}{8}$ Bv, $-6/8$ Bv, and $-\frac{7}{8}$ Bv. By applying the obtained difference in one of the fourteen levels, a corresponding fraction part is detected which is added to the integer part.

Figure 26:
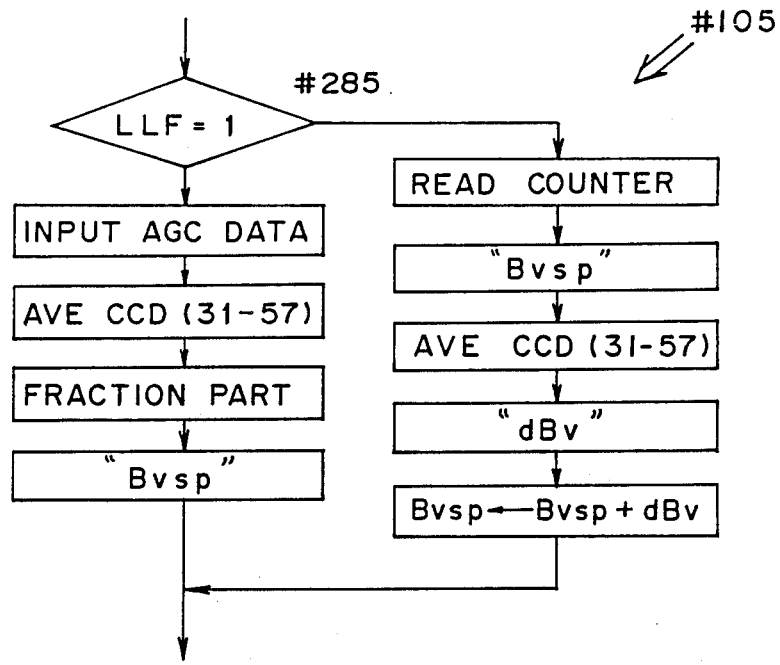
FIG. 26 is a flow chart showing a modification of step #105 shown in FIG. 12b.

Referring to FIG. 26, a flow chart, which may be used for step #105 shown in FIG. 12a, is shown. The brightness information obtained by these steps is based on the image formed on CCD cells and, therefore, it is more accurate than that obtained through the monitor photodiode.

Figure 27A:
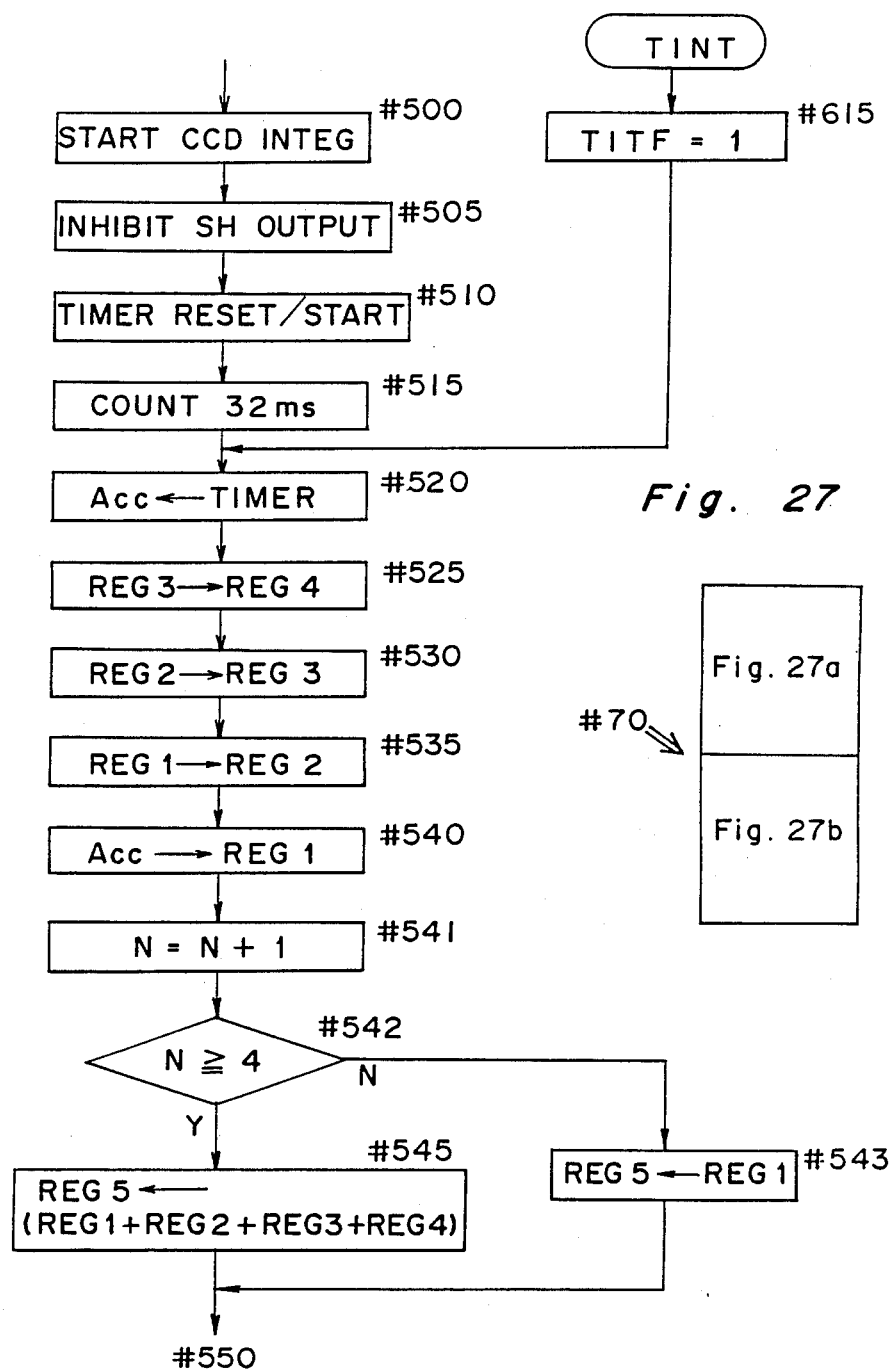
FIGS. 27a and 27b, together as shown in FIG. 27, are a flow chart showing a detail of step #70 shown in FIG. 11.
Figure 27B:
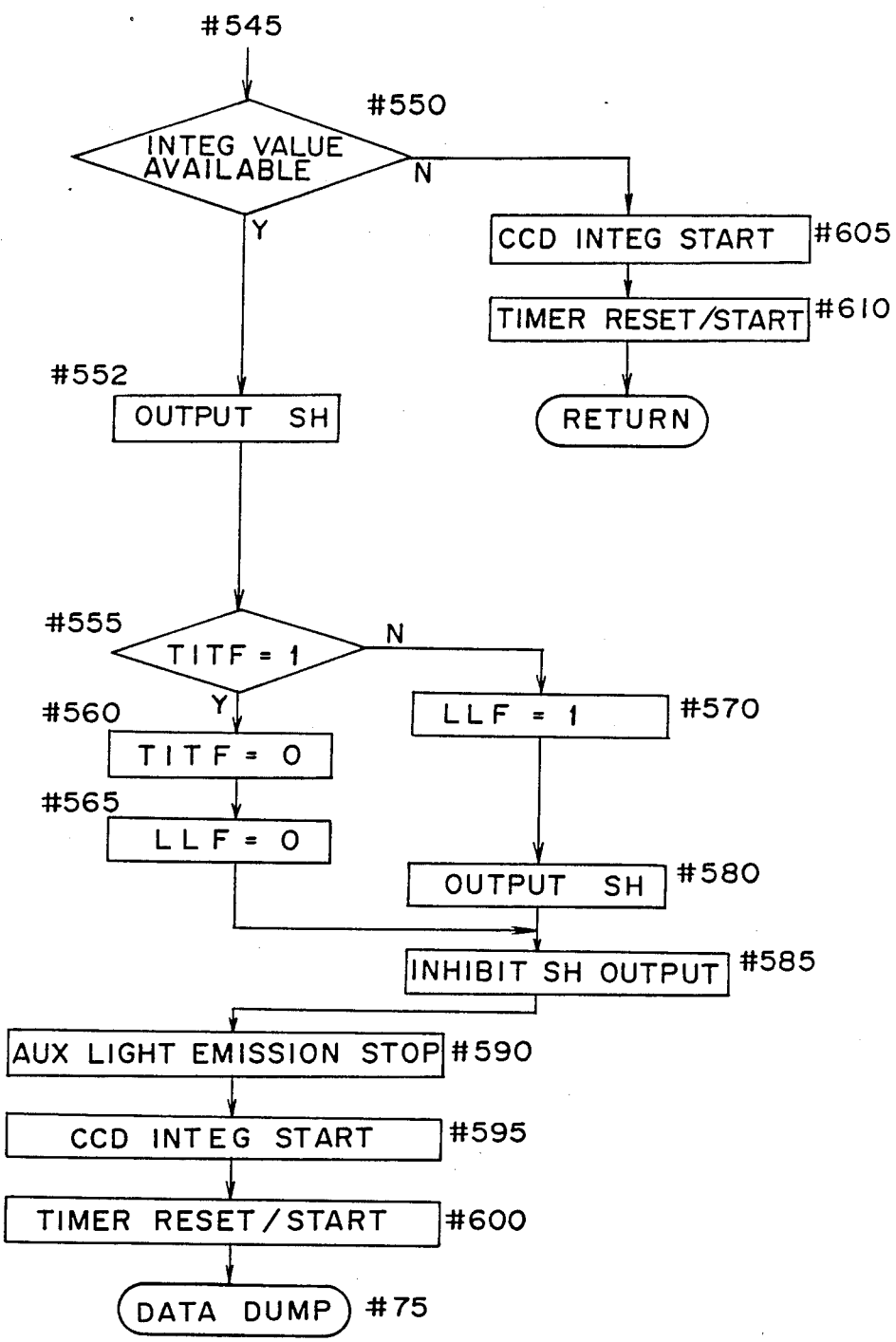

Referring to FIGS. 27a and 27b, taken together as shown in FIG. 27, show an example of step #70 (FIG. 11) for the CCD inegration. When the CCD integration starts (step #500), a shift pulse enabling signal SHEN is made LOW so as to prohibit the generation of the shift pulse (step #505), and then, the timer is reset and starts counting (step #510) the maximum available integration time, i.e., 32 milliseconds. When the integration ends before counting the maximum available integration time, TINT interrupt starts and, therefore, a flag TITF indicating the presence of the TINT interruption is set (step #615). Then, the program goes to step #520, which is entered also when the counter has counted the maximum available integration time, 32 milliseconds. The time counted by the counter is shifted to an accumulator Acc (step #520). Then, the contents of register 3 is moved to register 4 (step #525), the contents of register 2 is moved to register 3 (step #530), the contents of register 1 is moved to register 2 (step #535), and the contents of accumulator Acc is moved to register 1 (step #540). Then, "1" is added to a variable N indicating the nuimber of cycles of operations passed through step #541. Then, it is detected whether or not the variable N is equal to or greater than "4". If not, the contents of register 1 is moved to register 5 (step #543). The variable N is reset to zero when switch S1 is turned off and is provided for counting the number of times the integration has been carried out. When the variable N is equal to or greater than "4", the contents in registers 1-4 are added and is divided by "4" to obtain an average which is stored in register 5. In this embodiment, register 5 is used as a register for counting time.

Then, at step #550 (FIG. 27b), it is detected whether or not the integrated value can be processed in the further steps. If not, such as when the previous data is still being processed (a case when the object is very bright), the next data can not be used, and therefore, the program goes to step #605 for starting the CCD integration and then to step #610 for resetting and starting the timer. Then, the program returns. If the integrated value can be processed, the shift pulse enabling signal SH is made HIGH to permit the generation of the shift pulse SH (step #552). If the TINT interrupt is being effected, the shift pulse SH is generated from the SH pulse generator at this time. Then, it is detected at step #555 whether or not the procedure is entered from the TINT interrupt or not by detecting the flag TITF. IF yes, the program goes to step #560 to clear the flag TITF and further to step #565 to clear the low brightness flag LLF, and then it advances to step #585. On the contrary, if the flag TITF is not set, that is when the maximum available integration time has been counted, the low brightness flag LLF is set (step #570) and, then, the shift pulse enabling signal SHEN is made HIGH so as to generate a shift pulse SH from the shift pulse generator (step #580).

Then, at step #585, the shift pulse enabling signal SHEN is made LOW so as to inhibit the generation of the shift pulse SH (step #585) and then, the auxiliary light emission stops (step #590). Thereafter, the CCD integration starts (step #595) and the timer is reset and starts to count the integration time. Then, the program goes to step #76 to damp the CCD data.

The operation as described above in connection with FIGS. 27a and 27b takes an advantage in that since the charge integration is effected even during the data damp or during the calculation, the average data is obtained vary fast.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. An exposure control device for use in a camera having an objective lens, comprising:
   focus detecting means including:
      light receiving means for receiving light from a predetermined area within a photographing frame for focus detection of said objective lens; and
      focus calculating means for calculating the focus condition of said objective lens in accordance with a result of the light received by said light receiving means;
   reliability detecting means for detecting a lack of the reliability of the focus detection of the focus detecting means on the basis of a result of the focus detection of the focus detecting means;
   brightness calculating means for calculating brightness data in said predetermined area based on an output signal of said focus detecting means;
   exposure data calculating means for calculating exposure data based on the brightness data;
   exposure control means for controlling an exposure of the camera based on the calculated exposure data; and
   exposure inhibiting means for inhibiting the exposure of the camera based on the exposure data, when said reliability detecting means detects the lack of the reliability of the focus detection of the focus detecting means.

2. An exposure control device for use in a camera having an objective lens, comprising:
   focus detecting means including:
      light receiving means for receiving light from a predetermined area within a photographing frame for focus detection of said objective lens; and
      focus calculating means for calculating the focus condition of said objective lens in accordance with a result of the light received by said light receiving means;
   reliability detecting means for detecting a lack of the reliability of the focus detection of the focus detecting means on the basis of a result of the focus detection of the focus detecting means;
   light measuring means for measuring the amount of light in an area nearly equal to said predetermined area in the photographing frame, to produce light measuring data corresponding to the measured amount of light;

exposure data calculating means for calculating exposure data based on the lighting measuring data;

exposure control means for controlling an exposure of the camera based on the calculated exposure data; and exposure inhibiting means for inhibiting the exposure of the camera based on the exposure data, when said reliability detecting means detects the lack of the reliability of the focus detection of the focus detecting means.

* * * * *